United States Patent
Ghosh et al.

(10) Patent No.: US 10,834,712 B2
(45) Date of Patent: *Nov. 10, 2020

(54) ASYNCHRONOUS MULTI-POINT TRANSMISSION SCHEMES

(71) Applicant: AT&T Intellectual Property I, L.P., Atlanta, GA (US)

(72) Inventors: Arunabha Ghosh, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,213

(22) Filed: Aug. 27, 2019

(65) Prior Publication Data

US 2019/0387520 A1   Dec. 19, 2019

Related U.S. Application Data

(63) Continuation of application No. 15/343,543, filed on Nov. 4, 2016, now Pat. No. 10,440,693.

(51) Int. Cl.
*H04J 13/00* (2011.01)
*H04W 72/04* (2009.01)
(Continued)

(52) U.S. Cl.
CPC ........ *H04W 72/0413* (2013.01); *H04B 7/024* (2013.01); *H04B 7/0697* (2013.01);
(Continued)

(58) Field of Classification Search
USPC ....... 370/229, 230, 252, 328, 329, 330, 334, 370/400, 441, 479
See application file for complete search history.

(56) References Cited

U.S. PATENT DOCUMENTS

| 8,406,332 B2 | 3/2013 | Bayesteh et al. |
| 8,712,399 B2 | 4/2014 | Chen et al. |

(Continued)

FOREIGN PATENT DOCUMENTS

| EP | 2 981 001 A1 | 2/2016 |
| JP | 2015-515761 A | 5/2015 |

(Continued)

OTHER PUBLICATIONS

Communication pursuant to Rules 161(1) and 162 EPC for European Application No. 17783620.2 dated Jun. 12, 2019, 3 pages.
(Continued)

*Primary Examiner* — Kwang B Yao
*Assistant Examiner* — Nguyen H Ngo
(74) *Attorney, Agent, or Firm* — Amin, Turocy & Watson, LLP

(57) ABSTRACT

Asynchronous multi-point transmission techniques for MIMO networks are provided. An example method comprises receiving, by a device comprising a processor, a first data signal from a first TP device of a wireless communication network, wherein the first data signal comprises first code-word information generated based on a data. The method further comprises receiving, by the device, a second data signal from a second TP device of the wireless communication network, wherein the second data signal comprises second code-word generated based on the data, wherein the first code-word information and the second-code word information are different, and wherein the first TP device and the second TP device are geographically separated by a threshold distance. The device can further process the first data signal and the second data signal to generate a unified data signal representative of the data.

20 Claims, 12 Drawing Sheets

(51) Int. Cl.
H04B 7/024 (2017.01)
H04B 7/06 (2006.01)
H04L 1/00 (2006.01)
H04L 5/00 (2006.01)
H04W 72/02 (2009.01)

(52) U.S. Cl.
CPC ............ *H04L 1/004* (2013.01); *H04L 1/0026* (2013.01); *H04L 5/0033* (2013.01); *H04L 5/0035* (2013.01); *H04W 72/02* (2013.01); *H04L 5/0057* (2013.01)

(56) References Cited

U.S. PATENT DOCUMENTS

| | | | |
|---|---|---|---|
| 9,154,251 | B2 | 10/2015 | Elemad et al. |
| 9,300,369 | B2 | 3/2016 | Nammi et al. |
| 9,307,521 | B2 | 4/2016 | Ng et al. |
| 9,385,792 | B2 | 7/2016 | Seo et al. |
| 9,490,888 | B2 | 11/2016 | Cui et al. |
| 2010/0074350 | A1 | 3/2010 | Malladi et al. |
| 2013/0083681 | A1 | 4/2013 | Ebrahimi Tazeh Mahalleh et al. |
| 2013/0279437 | A1 | 10/2013 | Ng et al. |
| 2014/0192734 | A1* | 7/2014 | Ng ................. H04L 5/0053 370/329 |
| 2015/0043499 | A1 | 2/2015 | Yue et al. |
| 2015/0117394 | A1 | 4/2015 | Wang et al. |
| 2015/0257139 | A1 | 9/2015 | Chen et al. |
| 2016/0173173 | A1 | 6/2016 | Nammi et al. |
| 2016/0248561 | A1* | 8/2016 | Davydov ............ H04B 7/0413 |
| 2016/0269940 | A1* | 9/2016 | Takeda ................ H04W 24/02 |
| 2017/0188286 | A1 | 6/2017 | Yonekura et al. |
| 2017/0207827 | A1 | 7/2017 | Cui et al. |
| 2017/0223547 | A1* | 8/2017 | Yu ..................... H04W 16/32 |
| 2018/0048372 | A1* | 2/2018 | Sun .................... H04B 7/0639 |
| 2018/0102877 | A1 | 4/2018 | Jiang et al. |
| 2018/0146460 | A1 | 5/2018 | Lee et al. |

FOREIGN PATENT DOCUMENTS

| | | |
|---|---|---|
| JP | 2016-506690 A | 3/2016 |
| JP | 2016-509430 A | 3/2016 |
| WO | 2010/105555 A1 | 9/2010 |
| WO | 2013/1366777 A1 | 9/2013 |

OTHER PUBLICATIONS

Notice of Reasons for Refusal for Japanese Patent Application No. 2019-523079 dated Jun. 6, 2020, 10 pages.
ZTE Corporation, ZTE Microelectronics, "Potential enhancements for non-coherent JT", [online], 3GPP TSG-RAN WG1#86 R1-166333, Internet <URL:http://www.3gpp.org/ftp/tsg_ran/WG _RL1/TSGR1_360/Docs/R1-166333. zip>,2016, 5 pages.
Nokia, Alcatel-Lucent Shanghai Bell, "Discussion and Preliminary Simulation Results of NCJT Case 1 of FeCoMP", [online], 3GPP TSG-RAN WG1#86b R1-1608933, Internet<URL:http://www.3gpp.org/ftp/tsg_ran/WG1_RL1/ TSGR1_86b/Docs/R1-Oct. 14, 2015 1608933.zip>,2016, 6 pages.
Qualcomm Incorporated, "Enhancements for Non-Coherent Joint-Transmission", [online], 3GPP TSG-RAN WG1#86b R1-1610016, the Internet<URL:http://www.3gpp.org/ftp/tsg_ran/WGl_RL1/TSGR1_86 b/Docs/R1-1610016.zip>, Oct. 14, 2016, 6 pages.
Non-Final Office Action received for U.S. Appl. No. 15/343,543 dated Jun. 27, 2018, 34 pp.
Final Office Action received for U.S. Appl. No. 15/343,543 dated Jan. 22, 2019, 26 pages.
Mosleh et al., "Proportional-Fair Resource Allocation for Coordinated Multi-Point Transmission in LTE-Advanced", IEEE Transactions on Wireless Communications, vol. 15, No. 8, Aug. 2016, 13 pages.
Li, "Resource Allocation in Downlink Coordinated Multi-Point Systems", Thesis for the degree of Licentiate of Engineering, Dec. 2012, 48 pages.
International Search Report and Written Opinion received for PCT Application Serial No. PCT/US2017/052576 dated Jan. 9, 2018, 17 pages.
Nokia et al., "Discussion and Preliminary Simulation Results of NCJT Case 1 of FeCoMP", URL: http://www.3gpp.org/ftp/Meetings_3GPP SYNC/RAN1/Docs/, vol. RAN WG1, No. Lisbon, Portugal, Oct. 9, 2016, 7 pages.
Qualcomm, "Enhancements for Non-Coherent Joint Transmission", URL: http://www.3gpp.org/ftp/Meetings_3GPP SYNC/RAN/Docs/, vol. RAN WG1. No. Lisbon, Portugal, Oct. 9, 2016, 6 pages.

* cited by examiner

ASYNCHRONOUS MULTI-POINT TRANSMISSION SCHEMES

RELATED APPLICATION

The subject patent application is a continuation of, and claims priority to, U.S. patent application Ser. No. 15/343,543, filed Nov. 4, 2016, and entitled "ASYNCHRONOUS MULTI-POINT TRANSMISSION SCHEMES," the entirety of which application is hereby incorporated by reference herein.

TECHNICAL FIELD

This disclosure relates generally to asynchronous multi-point transmission schemes and more particularly to asynchronous multi-point transmission schemes for fifth generation (5G) multiple-input and multiple-output (MIMO) networks.

BACKGROUND

Multi-point transmission is a concept wherein data is transmitted to a user equipment (UE) from geographically distributed transmission points (TPs), (e.g., base stations, eNodeBs, remote radio units (RRUs), etc.). Multi-point transmission schemes have been a part of the third generation (3G) specification for long-term evolution (LTE) networks since Release 11. They have been proven to be a powerful concept in achieving higher throughput and capacity, especially at the cell edge. However, the early versions of multi-point transmission schemes, especially those described in 3G Release 11, require ultra low latency transport support for fast coordination between the multiple-transmission points and a cloud based or centralized radio access network (C-RAN) architecture. With a C-RAN architecture, the baseband processing for many cells is centralized and a centralized scheduler is employed to coordinate transmissions between the TPs. These types of multi-point transmission schemes are referred to as "coordinated" multi-point (CoMP) transmission schemes.

5G wireless systems represent the next major phase of mobile telecommunications standards beyond. Rather than faster peak Internet connection speeds, 5G planning aims at higher capacity than 3G and fourth generation (4G) LTE systems, allowing higher number of mobile broadband users per area unit, and allowing consumption of higher or unlimited data quantities. This would make it feasible for a large portion of the population to stream high-definition media many hours per day with their mobile devices, when out of reach of wireless fidelity hotspots.

Multi-point transmission has become an essential technique to improve the fairness and reliability of a wireless network. Multi-point transmission will be particularly important in future wireless networks such as 5G networks and beyond, since operating at high frequency makes cell edge guarantee a very difficult proposition. However, the low latency transport and C-RAN architecture requirements of CoMP transmission schemes are becoming progressively more difficult to achieve in advanced wireless communication systems, such as advanced LTE systems, 5G systems, and beyond. This is because advanced wireless networks require super low latency and high bandwidth. For example, in 5G networks, the time-scales over which TP schedulers need to be coordinated can be significantly less than the times-scales in LTE, due to a smaller transmission time interval (TTI) used to achieve super low latency (e.g., from about 125 micro seconds (μsec) to about 250 μsec for 5G compared to 1.0 millisecond (msec) for LTE). With such a tight scheduling time-scale for coordination, it is difficult to realize a C-RAN architecture for 5G under certain scenarios. Accordingly, multi-point transmission schemes that do not require the tight scheduling coordination between TPs associated with current CoMP transmission schemes are needed for advanced wireless networks.

DETAILED DESCRIPTION

Figure 1:
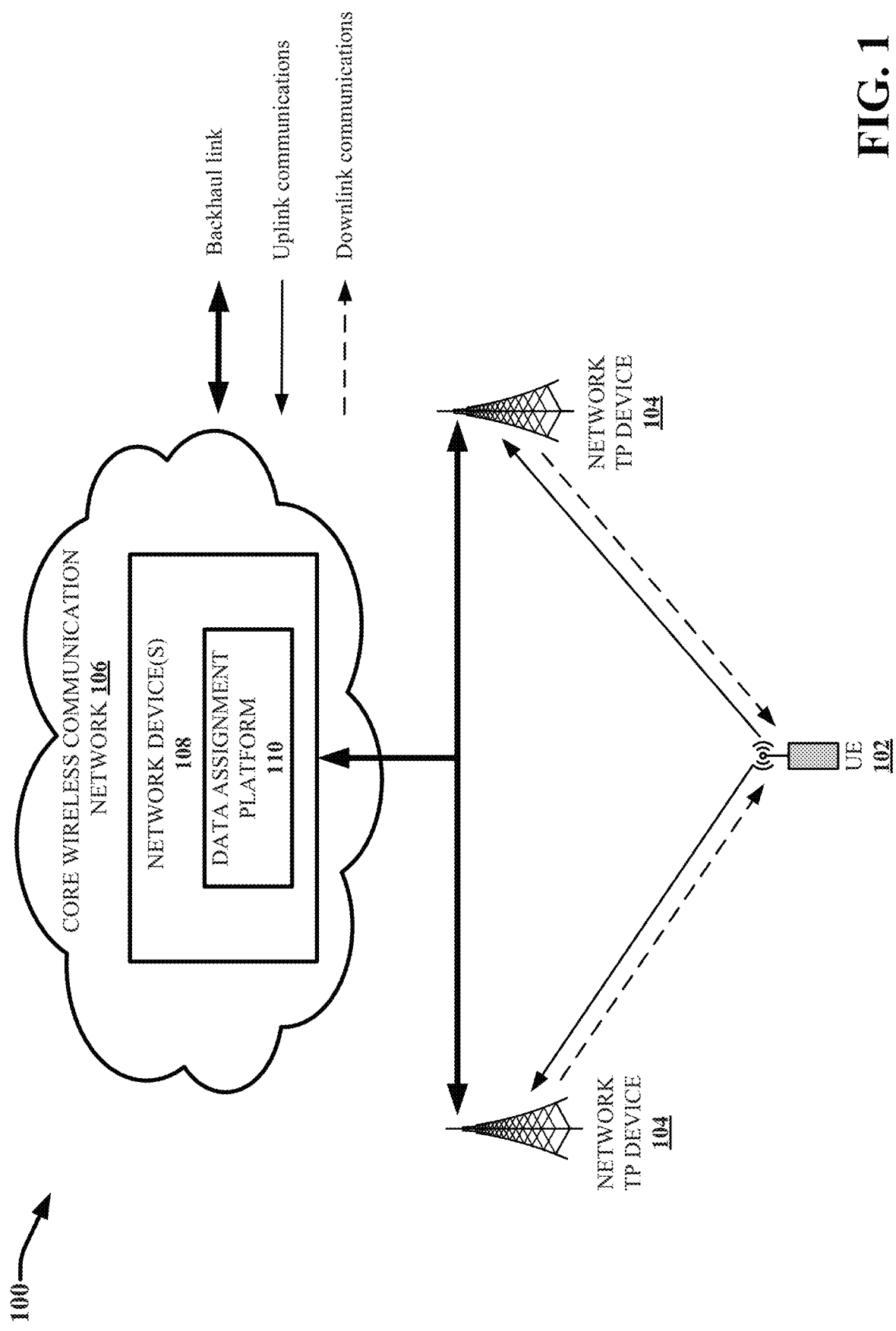
FIG. 1 is an illustration of an example wireless communication system that facilitates asynchronous multi-point transmission in accordance with various aspects and embodiments of the subject disclosure.

The subject disclosure is directed to computer processing systems, computer-implemented methods, apparatus and/or computer program products that facilitate asynchronous multi-point transmission schemes for 5G MIMO networks. With the subject asynchronous multi-point transmission schemes, instead of having the network devices (e.g., the network TPs, the network scheduler(s) devices, etc.) perform coordination task between TPs, the coordination can be performed completely by the UE or distributed between the UE and the TPs. This allows the plurality of TPs (e.g., two or more) to run with little or no coordination. In addition, a centralized scheduling entity is not required. On the contrary, independent schedulers can be deployed at each TP in the network and the TPs respectively communicating with a UE can autonomously perform radio frequency (RF) signaling procedures with the UE. As a result, the subject multi-point transmission schemes do not require ultra low latency transport nor a C-RAN architectures.

In one or more embodiments, in order to achieve multi-point transmission with relaxed TP coordination, respective TPs communicating with a UE can be configured to send separate code-words to the UE. Unlike traditional CoMP transmission, in this case, the separate code-words can include different information intended for the UE. In particular, each TP can be configured to transmit multiple layers and multiple code-word(s) to the UE and the UE can be configured to interpret the different spatial layers and code-words received from the respective TPs. Because the code-words and spatial layers transmitted by each TP do not need to be coordinated (i.e., the same), each TP can use independent schedulers. In addition, since separate schedulers can be used, it is not necessary for the physical resource block (PRB) allocation (i.e., resource allocation) of the spatial layers and code-word(s) from all the TPs to be same. As a result, the resource blocks and spatial layers allocated from each TP can also be independent. Further, since the UE receives the spatial layers from the plurality of TP independently, there is no need to maintain a strict quasi co-located (QCL) criteria between the TPs.

For example, various embodiments, the UE can partition the spatial layers and the PRBs between the TPs (e.g., based on channel state information (CSI) measured and/or determined by the UE). In some implementations, in association with partitioning the spatial layers, the UE can ensure the layer mapping is different for each TP to avoid having the TPs using the same layer(s). In one or more embodiments, the UE can also be configured to partition the transmission rank between the TPs based on the partitioned PRB. In association with partitioning the transmission rank between the TPs, the UE can also be configured to partition the rank to ensure that the total rank of the transmission across all the TP does not exceed the maximum rank capability of the UE. The UE can use all or a combination of some of these capabilities to perform the multi-point transmission coordination on its end and indicate to the network TPs the transmission parameters and hypothesis for each TP. For example, the UE can be configured to provide the respective TPs with feedback regarding the partitioned spatial layers, PRB and transmission rank. The TPs can then employ the feedback when sending code-word transmissions to the UE. In various additional embodiments, the TPs or their schedulers can be configured to perform some "slow" coordination to ensure that the total rank of the transmission across all the TP does not exceed the maximum rank the UE can handle and the layer mapping is different from each TP to avoid using the same layer on two TPs.

The subject, asynchronous multi-point transmission schemes remove the need for the infrastructure based coordination required for LTE CoMP transmission. Unlike the LTE CoMP transmission, the subject multi-point transmission schemes do not require ultra low latency transport between TPs for fast coordination. Nor do the subject multi-point transmission schemes require centralized scheduling, such as that provided by a C-RAN like architecture (which is mandatory for LTE CoMP transmission but can be hard to achieve). The ability for the proposed asynchronous multi-point transmission schemes to work with independent schedulers and minimal coordination make them extremely valuable for 5G MIMO technology, making the deployment of 5G networks significantly easier.

In one or more embodiments, a method is provided that includes receiving, by a device comprising a processor, a first data signal from a first TP device of a wireless communication network, wherein the first data signal comprises first code-word information generated based on a data directed to the device from another device. The method further includes receiving, by the device, a second data signal from a second TP device of the wireless communication network, wherein the second data signal comprises second code-word generated based on the data, wherein the first code-word information and the second-code word information are different, and wherein the first TP device and the second TP device are geographically separated by a threshold distance. The device can further process the first data signal and the second data signal to generate a unified data signal representative of the data. In various implementations, the first code-word information and the second code-word information are different based on usage of separate and unsynchronized transmission signal schedulers by the first TP device and the second TP device, respectively.

In some implementations, the first data signal and the second data signal are received by the device at unsynchronized times based on usage of separate and unsynchronized transmission signal schedulers by the first TP device and the second TP device, respectively. In addition, in some implementations, the first data signal and the second data signal can comprise different and non-overlapping PRB (PRB) allocations for the first code-word information and the second code-word information, respectively. For example, the first data signal and the second data signal can comprise the different and non-overlapping PRB allocations based on usage of separate and unsynchronized transmission signal schedulers by the first TP device and the second TP device, respectively. In some aspects, despite using separate and unsynchronized schedulers resulting in the different and non-overlapping PHB allocations, the total rank of the first data signal and the second data signal does not exceed a maximum rank capacity of the device. In one implementation, this is based on a result of a PRB partitioning coordination procedure performed between the first TP device and the second TP device. In another implementation, this is based on determination of the PRB partitioning by the device and provision of information identifying the PRB partitioning to the respective first and second TPs.

Further, in various additional implementations, the first data signal and the second data signal comprise different and non-overlapping spatial layer assignments for the first code-word information and the second code-word information, respectively. For example, the first data signal and the second data signal can comprise the different and non-overlapping spatial layer assignments based on usage of separate and unsynchronized transmission signal schedulers by the first TP device and the second TP device, respectively. In some aspects, despite using separate and unsynchronized schedulers resulting in the different spatial layer assignments, the different spatial layers assignments do not overlap and a total rank of the first data signal and the second data signal does not exceed a maximum rank capacity of the device. In one implementation, this is based on a result of a spatial layer and rank partitioning coordination procedure performed between the first TP device and the second TP device. In another implementation, this is based on determination of the different spatial layer assignments and rank assignments by the device and provision of information identifying the different spatial layer assignments and the rank assignments to the respective first and second TPs.

The term "geographically separated" is used herein to indicate the two TPs are not located on a same device, such as a device including two or more transmitters, wherein the two or more transmitters serve as the respective TPs. For example, TPs that are geographically separated include transmitting devices and/or transmitters that are located or associated with different network cells including, macro cells, microcells, picocells, and femtocells, and the like. In this sense, the threshold distance can vary. In one or more implementations, the threshold distance is greater than or equal to about 10 meters. In another implementation, the threshold distances is greater than or equal to about 1000 meters. In another implementation, the threshold distance is greater than or equal to about 1 mile.

In another embodiment, a first TP device of a wireless communication network is provided that comprises a processor, and a memory that stores executable instructions that, when executed by the processor, facilitate performance of operations. These operations can comprise receiving a data transport block comprising a first portion of data directed to a device, processing the data to generate first signal data comprising first code-word information representative of the data. The operations further comprise transmitting the first signal data to the device in association with transmission, by a second TP device of the wireless communication network, of second signal data to the device. In accordance with these operations, the second signal data comprises second code-word information representative of a second portion of the data. In addition, the first TP device and the second TP device are geographically separated by a threshold distance. In one or more implementations, the transmitting the first signal data is unsynchronized in time relative to the transmission of the second signal data based on usage of separate and unsynchronized transmission signal schedulers by the first TP device and the second TP device, respectively. In some implementations, the first code-word information and the second code-word information are different based on usage of separate and unsynchronized transmission signal schedulers by the first TP device and the second TP device, respectively.

In yet another embodiment a machine-readable storage medium, comprising executable instructions that, when executed by a processor of a device, facilitate performance of operations. These operations can include determining rank assignments that partition a maximum rank capacity of the device between respective TP devices based on channel state information associated with communication links between the device and the respective TP devices, respectively. The operations also include determining different and non-overlapping spatial layer assignments that assign different spatial layers to the respective TPs in accordance with the rank assignments. The operations further include sending rank assignment information identifying the rank assignments to the respective TP devices, and sending spatial layer assignment information identifying the different and non-overlapping spatial layer assignments to the respective TPs. In addition, the operations include receiving data signals from the respective TPs, wherein the data signals respectively comprise information representative of same data sent to the device and wherein the data signals respectively have the different and non-overlapping spatial layer assignments.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of an example wireless communication system 100 that facilitates asynchronous multi-point transmission in accordance with various aspects and embodiments of the subject disclosure. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

System 100 can comprise one or more UEs 102, two or more network TP devices 104 (i.e., the TPs) and a core wireless communication network 106. It should be appreciated that a single UE 102 is depicted for exemplary purposes and that any number of UEs can be included in system 100. Likewise, various aspects of the subject asynchronous multi-point transmission schemes are exemplified with respect to two network TP devices 104 as TPs. However, it should be appreciated that the subject system 100 and the subject asynchronous multi-point transmission schemes can be employed in association with multi-point transmission involving more than two TPs (e.g., three TPs in many implementations, four TPs, etc.). In addition, in the embodiment shown, the network TP devices 104 are geographically separated (relative to a threshold distance). For example, the network TP devices 104 can respectively be located in and server different cells. However, the subject techniques asynchronous multi-point transmission techniques can also be applied to network TP devices 104 or TPs that are co-located or QCL (i.e., not geographically separated relative to the threshold distance).

The UE 102 can include a variety of different mobile and stationary device types that can be configured to operate using one or more aspects of the subject asynchronous multi-point transmission scheme protocols. For example, the UE 102 can include but is not limited to: a cellular phone, a smartphone, a tablet computer, a wearable device, a virtual reality (VR) device, a heads-up display (HUD) device, and the like. The UE 102 can also be configured with machine-type communication (MTC) or machine to machine (M2M) capabilities (Category-M1, Category-M2, Category-0, Category-1, narrowband (NB)-IoT and the like). For example, the UE 102 can be or include metering devices, implantable medical device (IMDs), sensor and/or control devices associated with home automation systems, tracking devices, point of sale devices (e.g., vending, machines), security devices (e.g., associated with surveillance systems, homes security, access control, etc.), any Internet of things (IOT) device (e.g., toaster, coffee maker, blinds, music players, speakers, etc.), and/or any connected vehicles (cars, airplanes, space rockets, and/or other at least partially automated vehicles (e.g., drones)) and the like.

In accordance with the subject asynchronous multi-point transmission schemes, the UE 102 can be communicatively coupled the two or more network TP devices 104 which operate as network transmission points. The non-limiting term network TP device is used herein to refer to any type of network node (or radio network node) serving a UE 102 and/or connected to other network node, network element, or another network node from which the UE 102 can receive a radio signal. For example, the network TP devices 104 can comprise or be coupled to a NodeB, an eNodeB, a radio or transmitter/receiver of a NodeB/eNodeB, a base station device, an access point (AP) device, and the like. Other examples of network nodes (e.g., network TP devices 104) can include but are not limited to: multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like. In the embodiment shown, the UE 102 can send and/or receive wireless communications via wireless link to established between the UE 102 and the respective network TP devices 104. The thin solid arrow line from the UE 102 to a network TP device 104 represents uplink communications and the thin dashed arrow line from a network TP device 104 to the UE 102 represents downlink communications.

In various embodiments, system 100 can be or include one or more communication service provider networks that facilitate providing wireless communication services to various UEs, including UE 102, via the network TP devices 104 and/or various additional network devices (not shown). In addition to the access network layer (e.g., the network TP devices 104), the communication service provider network can include a core wireless communication network including various network devices 108 that facilitate various central processing roles and services associated with providing wireless communication services via wireless communication system 100. For example, the core wireless communication network 106 can include various network devices 108 that facilitate providing wireless communication services to the UEs 102 via the network TP devices 104 and/or various additional network devices (not shown). For example, the one or more network devices 108 of the core wireless communication network 106 can include but are not limited to: mobile switching center (MSCs) devices, a home location register (HLR) device, a visitor location register (VLR) device, authentication center (AUC) devices, provisioning servers, billing servers, operation and support system (OSS) devices, short message service center (SMSC) devices, and many other elements.

In accordance with the subject multi-point transmission schemes one or more of the network devices 108 can be or include a data assignment platform 110. The data assignment platform 110 can be configured to assign data traffic, sent from another device (e.g., another UE, another system device, a network device, a virtual device, etc.) to the UE 102, to two or more TPs (e.g., the respective network TP devices 104). In wireless networks, and particularly cellular networks, user data and signaling messages directed to the UE 102 are processed by various network layers/devices associated with the core wireless communication network 106, (e.g., one or more network devices 108 of the core wireless communication network 106), before being passed down to the physical (PHY) layer including the network TP devices 104 to be sent over the air (OTA) to the UE 102. For example, in LTE networks, the network layers preceding the PHY layer include but are not limited to: the packet data convergence protocol (PDCP) layer, the radio link control (RLC) layer, and the media access control (MAC) layer, etc.). These layers perform various types of processing on the user data before sending it to the PHY layer for transmitting to the UE. The user data that is sent from these core network layers/device to the PHY layer device(s), (i.e., the network TP devices 104), can be received as one or more data packets, a data stream, one or more segments of data, one or more chunks of data, and the like, (which varies depending on the data transport protocol employed, the terminology associated with the data transport protocol, and the type of data). In association with the subject multi-point transmission schemes, the data assignment platform 110 is configured to assign data directed to the UE to two or more TPs that have been selected to send the data to the UE at the PHY layer in association with multi-point transmission. When the data is sent from the network device 108 to the respective TPs (e.g., the network TP devices 104) as assigned by the data assignment platform, the data is sent as one or more data transport blocks. The network TP devices 104 then process the data into data signals that are then scheduled by one or more schedulers or scheduler components associated with network TP devices 104 and transmitted to the UE.

In some embodiments, the network TP devices 104 can use a centralized scheduler device or component (not shown) that performs multi-point transmission scheduling functions for the respective TPs of systems 100 (i.e., the network nodes). This type of configuration is used for systems employing a C-RAN infrastructure. In other embodiments, some of the network TP devices 104 can share a common scheduler while others may have their own dedicated scheduler. However, in various exemplary embodiments, each of the network TP devices 104 can include or be associated with an individual scheduler component or dedicated scheduler device (not shown). According to these embodiments, the scheduler component/device associated with each of the network TP devices 104 can be communicatively coupled to the network TP device 104, and in some embodiments physically co-located with the network TP device 104. In other implementations, the scheduling component/device associated with each of the network TP devices 104 can be (or be included with) a network device 108 included in the core wireless communication network 106 or another device external to the network TP device 104.

System 100 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 includes a large scale cellular network that spans various geographic areas. According to this implementation, system 100 can include a plurality of different geographically located network TP devices 104 that serve as network TPs. The network TP devices 104 can be connected to the core wireless communication network 106 via one or more backhaul links (depicted by the thick arrow line). For example, the one or more backhaul links can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular or wireless communication technologies that support multi-point transmission to facilitate wireless radio communications between devices (e.g., the UE 102 and the network TP devices 104, between the network nodes and the one or more of the network devices 108, between the UE and other UEs, etc.). For example, although various aspects and embodiments of the subject asynchronous multi-point transmission schemes are described herein in the context of 5G, the disclosed aspects are not limited to 5G. For example, aspects or features of the disclosed asynchronous multi-point transmission schemes can be exploited in substantially any wireless communication technology that support multi-point transmission or MIMO technology. Such wireless communication technologies can include but are not limited to: Universal Mobile Telecommunications System (UMTS), LTE systems, 2G systems, 3G systems, 4G systems, Code Division Multiple Access (CDMA), Wi-Fi, Worldwide Interoperability for Microwave Access (WiMAX), General Packet Radio Service (GPRS), Enhanced GPRS, Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

In one or more embodiments, system 100 is adapted to facilitate asynchronous multi-point transmission between the TPs (e.g., network TP devices 104) and UEs (UE 102) of the system 100. Multi-point transmission is a concept wherein data is transmitted to a UE (e.g., UE 102) from geographically separated TPs (e.g., network TP devices 104) to improve performance, especially for those UEs that would otherwise, in the case of downlink, see significant interference from multiple transmission points. In traditional LTE multi-point transmission schemes such as CoMP transmission, transmissions sent by the respective TPs (e.g., the network TP devices 104) to the UE (e.g., UE 102) must be tightly coordinated with respect to transmission signal content, transmission parameters and timing.

Figure 2:
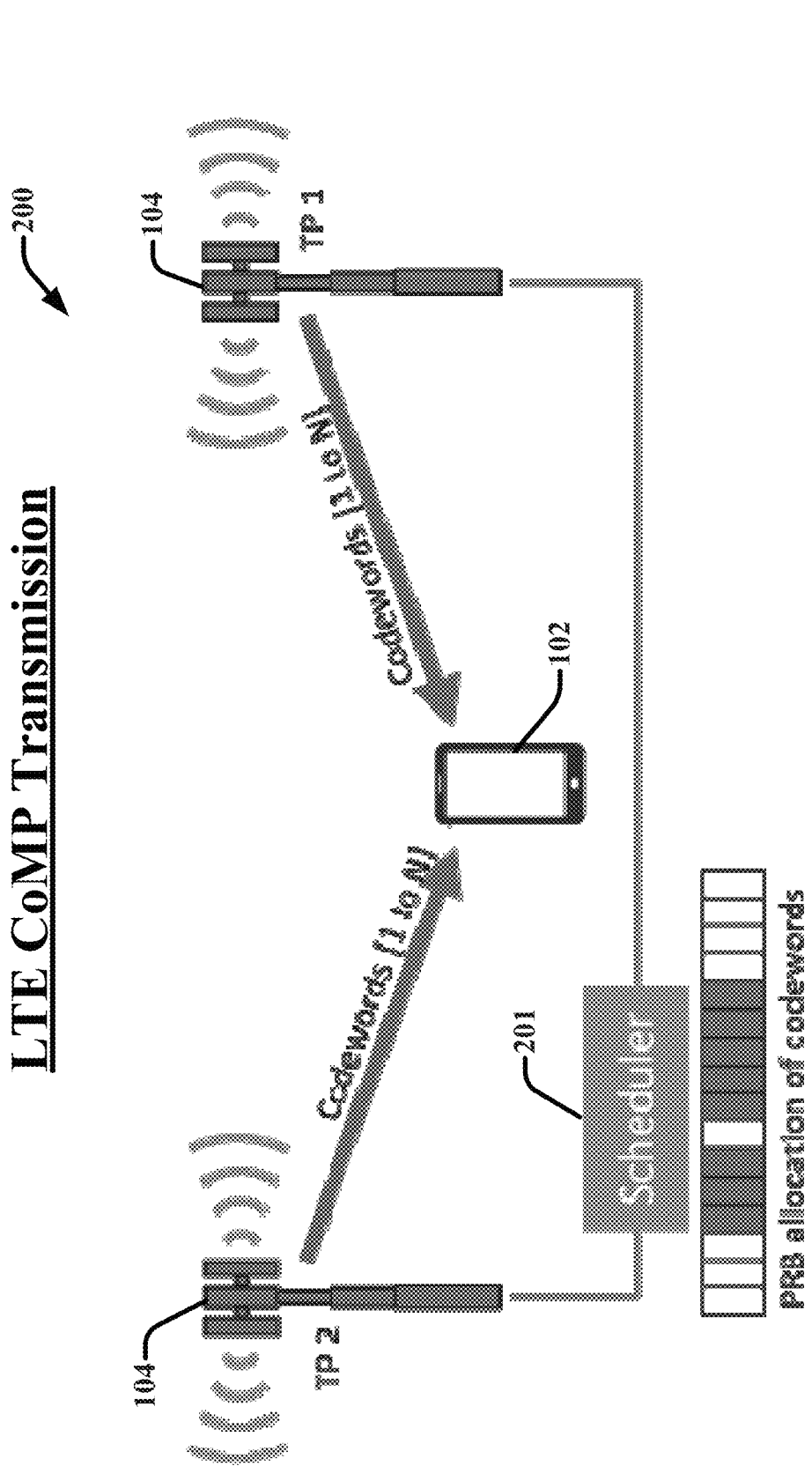
FIG. 2 provides an illustration demonstrating principles of an example LTE CoMP transmission scheme in accordance with various aspects and embodiments of the subject disclosure.

For example, FIG. 2 presents an illustration demonstrating principles of a traditional LTE CoMP transmission scheme 200 in accordance with various aspects and embodiments of the subject disclosure. For example, the LTE CoMP transmission scheme 200 can represent the classic joint transmission (JT) schemes as defined in the LTE Release 11.

As shown in FIG. 2, two network nodes, TP1 and TP2 respectively, are transmitting data signals to a UE 102. Traditional multi-point transmission schemes as used in LTE require all the TPs to transmit the same data content. For example, in the embodiment shown, TP1 and TP2 are respectively transmitting code-words 1-N. The term "code-word" refers to the user data before it is formatted for transmission. One or two code-words may be used per TTI depending on the conditions of the channel and the use case. In the most common case of a single user MIMO (SU-MIMO), two code-words are sent to a single handset UE per TTI.

In addition to transmitting the same code-words, with traditional LTE multi-transmission schemes, the respective TPs must transmit data signals using the same transmission formatting parameters, including but not limited to: layer mapping, modulation and coding schemed (MCS) level, occupied PRBs for each of the code-words, etc. For example, in conventional non-CoMP multi-antenna (MIMO) operation and CoMP operation, the respective TPs adapts the transmission parameters based on the quality of the link to the UE. In this so-called "link adaptation" as commonly adopted in modern wireless communications, the UE 102 needs to estimate a channel state information (CSI) for a hypothetical data transmission. To support joint transmission associated with CoMP, the UE has to feedback the CSI information, assuming joint transmission from the aggregated set of antennas corresponding to the transmission points (e.g., TP1 and TP2). Such CSI could include information related to the transmission rank, which is essentially the number of spatial streams transmitted to a UE, the channel quality index information, which is essentially the modulation and coding scheme (MCS) that can be supported on each of the code-words that may be mapped to the spatial streams, and the precoding matrix index (PMI), which is the precoding weights used on the aggregated set of antennas channel quality information (CQI or sum CQI) and the like.

The respective TPs then coordinate common transmission parameters (e.g., using a shared scheduler 201) for usage when transmitting data signals to the UE. In particular, based on feedback received from the UE 102, the scheduler 201 can determine ideal parameters for layer mapping, MCS level, occupied PRBs for each of the code-words, etc. For example, in the embodiment shown, a common PRB allocation of the code-words is shared between the respective TPs and applied to the signals respectively transmitted by the TPs.

In addition, with LTE CoMP, the timing of reception, by the UE, of respective signals transmitted by different TPs must also be coordinated. For example, when the code-words, spatial layers, PRB allocation, etc. of the respective signals received by the UE from the different TPs are the same, the UE signals are intended to be interpreted by the UE as echos of one another. The UE is configured to interpret both signals as a unified signal in accordance with multipath signaling techniques. In order for the UE to interpret both signals in accordance with multipath processing, both signals need to be received within a minimal time delay. Accordingly, with traditional LTE CoMP techniques, the respective TP must coordinate their transmissions in the time domain to appear to be what is referred to herein as quasi co-located (QCL), to the UE. The term QCL indicates that the signals transmitted by the respective TPs are received at the UE with sufficient time-frequency coherence to be received with a single synchronization instance (e.g., within a single fast Fourier transform (FFT)). Therefore even though the TPs are not actually co-located they appear as such to the receiver at the UE.

With Reference to FIGS. 1 and 2, in order to achieve coordinated signaling between TPs with respect to content, formatting, and time, traditional LTE CoMP schemes require the network (e.g., network 100) to employ a C-RAN or C-RAN like architecture to centralize the scheduling operations and implement an ultralow latency transport between TPs. For example, as shown in FIG. 2, the TPs share a centralized scheduler 201 that performs the coordination both the TPs. Alternatively, multiple schedulers can be used for the respective TPs as long as "ideal" backhaul is achieved. In this context "ideal" backhaul refers to having zero latency and infinite bandwidth between the schedulers therefore any kind of coordination between the schedulers can be achieved instantly. In the case of 5G these limitations needed for tight TP coordination become increasingly difficult to satisfy due to the shrinking latency budget and increasing transport bandwidth targeted with 5G networks. For example, in 5G networks, to achieve super low latency, the TTI over which TP schedulers need to be coordinated can be less than 250 μsec to even about 125 μsec. This time scale interval is significantly less than that require for traditional LTE, which is about 1.0 msec. With such a tight scheduling time-scale for coordination, the stringent coordination requirements of traditional LTE multi-point transmission techniques make it very difficult to nearly impossible to achieve CoMP transmission while providing the ultra low latency and high bandwidth desired for advanced wireless communication networks (e.g., 5G networks).

The disclosed multi-point transmission techniques mitigate the restrictions attributed to the tight coordinated scheduling requirements of CoMP transmission schemes using a techniques referred to herein as asynchronous multi-point transmission. The subject multi-point transmission techniques are referred to as "asynchronous" because unlike traditional LTE multi-point transmission schemes like CoMP transmission, the TPs of system 100 (i.e., the network TP devices 104) do not need to tightly coordinate data transmissions sent by two or more of the TPs (e.g., the respective network TP devices 104) to a single UE (e.g., UE 102), with respect to content, formatting and timing. On the contrary, with the subject asynchronous multi-point transmission schemes, the code-words and/or one or more of the transmission parameters (e.g., such as layer mapping, MCS level, occupied PRBs for each of the code-words, etc.) sent from the different geographically separated TPs (e.g., the respective network TP devices 104) to the UE (e.g., UE 102) can be different. In addition, because the UE receives the code-words and spatial layers from the respective TPs independently, there is no need to maintain a strict QCL timing criteria between the multiple TPs. Thus the TPs or schedulers for the TPs can perform little or no coordination/synchronization with respect to transmission signal content, formatting and timing. Further, a centralized scheduler or scheduling system is also not needed.

Figure 3:
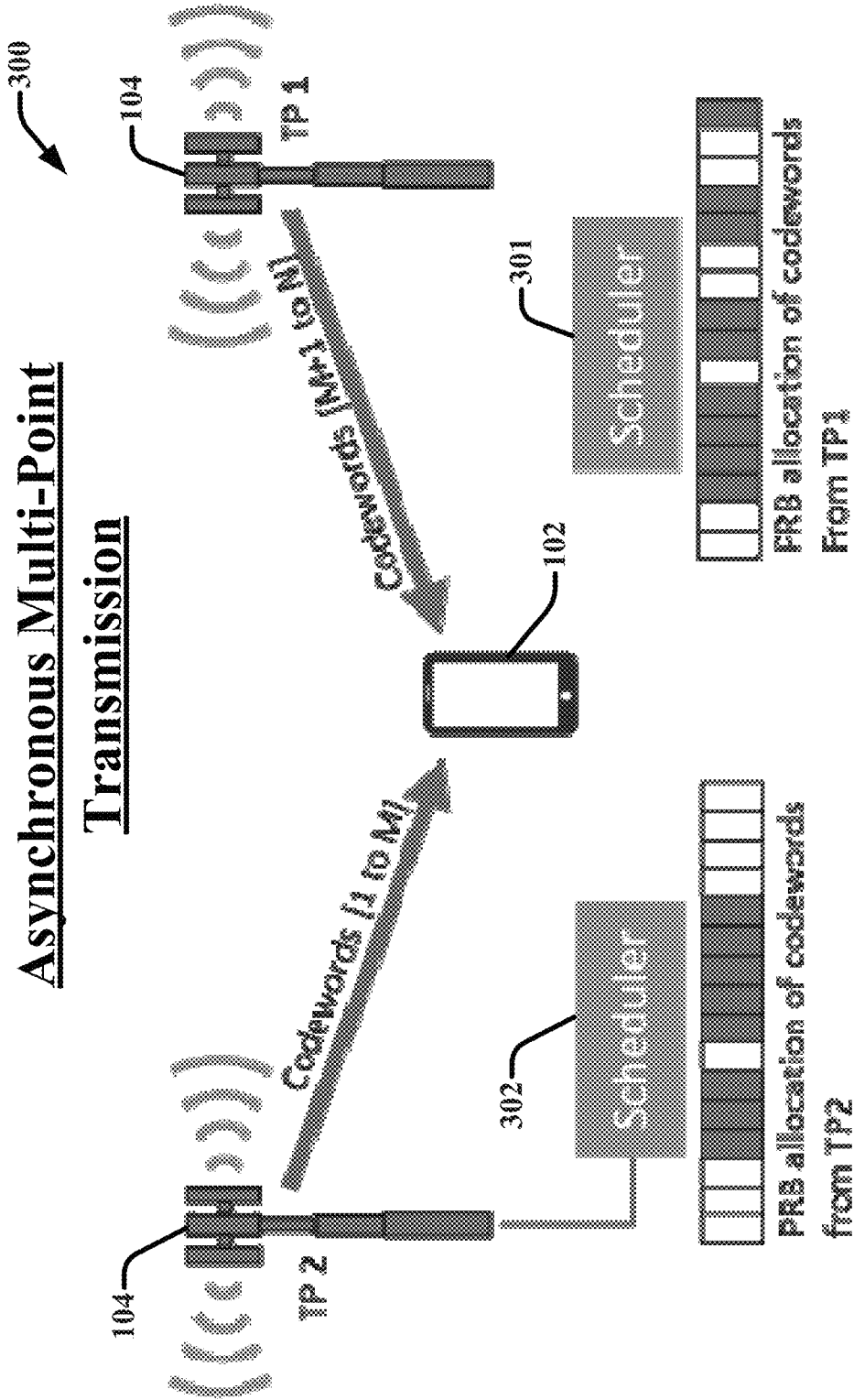
FIG. 3 provides an illustration demonstrating principles of an example asynchronous multi-point transmission scheme in accordance with various aspects and embodiments of the subject disclosure.

For example, FIG. 3 provides an illustration demonstrating principles of an example asynchronous multi-point transmission scheme 300 in accordance with various aspects and embodiments of the subject disclosure.

As shown in FIG. 3, two network nodes, TP1 and TP2 respectively, are transmitting data signals to a UE 102. However, unlike the traditional LTE CoMP transmission schemes (e.g., scheme 200), the data streams include different code-words. For example, TP2 is transmitting code-words 1-M and TP2 is transmitting code-words M+1 to N. The term code-word is used in wireless communication technology to refer to PHY layer encoded bits. In accordance with the subject asynchronous multi-point transmission schemes, reference to code-words being different can mean one of the following: 1. the code-words include or represent the same data, yet have different encoding schemes; 2. the code-words include or represent different subsets or portions of the same data and have same encoding schemes; or 3. the code-words include or represent different subsets or portions of the same data, yet have different encoding schemes.

For example, with reference to FIGS. 1 and 3, data that is processed via one or more network devices 108 and sent to the respective TPs as assigned by the data assignment platform 110 is sent to and received at the respective TPs as one or more data transport blocks. When a data transport block is received by a network TP device 104, the data transport block is processed into a code-word prior to sending to the UE in a data signal. There are a number of steps involved in this process, depending on the length of the transport block. For example, in some implementations, the network TP device (or the scheduler of the network TP device) can first append a 24 bit checksum (CRC) to the transport block. This CRC is used to determine whether the transmission was successful or not, and triggers Hybrid ARQ to send an ACK or NACK, as appropriate. Then the transport block is segmented into code blocks. A code block must be between 40 and 6144 bits long. If the transport block is too small, it is padded up to 40 bits; if the transport block is too big, it is divided into smaller pieces, each of which gets an additional 24 bit CRC. Next, each code block is processed with a ⅓ turbo coder and the resulting code blocks are reassembled into a single codeword. A codeword, then, is essentially a transport block with error protection. In various transmission protocols, the UE may be configured to receive one or two transport blocks (and hence one or two code-words) in a single TTI.

In traditional CoMP transmission schemes, a network node (e.g., the data assignment platform 110) receives data directed to the UE and sends copies of the same data to the respective TPs participating in multi-point transmission. For example, the network node sends, (or directs a network device to send), data transport blocks to each of the TPs, wherein each of the data transport blocks include the same data. The respective TPs then process the data transport blocks into data signals comprising same code-words (as shown in FIG. 2), wherein each of the code-words represent the same data. The respective TPs also coordinate processing of the respective transport blocks into the same code-words (wherein the respective code-words have the same encoding scheme). In this case, the UE receives data signals from the respective TPs that include different copies of the data from different transmission points. This type of transmission scheme is used to increase the reliability that the UE receives at least one copy of the data in case the communication links between the UE and one or more of the respective TPs are unreliable.

In accordance with the subject asynchronous multi-point transmission schemes, the respective TPs can send the UE the same data or different data. In particular, in some embodiments, when data directed to the UE is received and processed by the data assignment platform 110, the data assignment platform can send the respective TPs data transport blocks that include or represent same copies of the data. The TPs can then process the data transport blocks into data signals respectively comprising code-words representative of the same data. In other embodiments, the data assignment platform 110 can divide the data directed to the UE into two or more different portions or subsets of the data. The data assignment platform 110 can further send (or direct a network device 108 to send), each of the TPs data transport blocks that respectively represent different portions of subsets of the data. Each of the TPs can then process their respective portions or subsets of the data into data signals comprising different code-words, wherein the code-words respectively represent the different portions or subsets of the data. At the receiver side, the UE can combine the respective portions to generate a data stream, structure, etc., representative of the data as a whole. Breaking up the data directed to a UE into different portions or subsets and having different TPs transmit the different portions or subsets to the UE increases the overall signaling throughput.

In addition to the respective TPs being able to transmit the UE different portions or subsets of a data traffic directed to the UE, the manner in which the respective TPs process a data transport block into a code-word does not need to be synchronized. As a result, the respective TPs can generate code-words with different encoding schemes. Accordingly, in some implementations, the code-words transmitted by the respective TPs can represent the same data sent to the UE by another device (e.g., same data packet or packets, data stream, data block, data segment, etc.), yet having different encoding schemes. In other implementations, the code-words transmitted by the respective TPs can represent different subsets or portions of the same data sent to the UE by another device and have same encoding schemes. Still in other implementations, the code-words transmitted by the respective TPs can represent different subsets or portions of the same data sent to the UE by another device and have different encoding schemes. Finally, in some implementations, the code-words transmitted by the respective TPs can represent the same data have same encoding schemes (as with traditional CoMP). With these implementations however, the data signals sent by the respective TPs can still be unsynchronized in time and frequency (e.g., PRB allocation and spatial layer allocation, as discussed below).

In addition to transmitting different code-words, unlike the traditional LTE CoMP transmission schemes (e.g., scheme 200), with the subject asynchronous multi-point transmission schemes (e.g., scheme 300), the respective TPs can transmit the data signals using different transmission formatting parameters, (e.g., layer mapping, MCS level, occupied PRBs for each of the code-words, etc.). For example, in the embodiment shown, TP1 and TP2 have independent schedulers, schedulers 301 and 302 respectively. Each of the schedulers can independently analyze CSI feedback provided thereto by the UE 102 and autonomously determine PRB allocation for the code-words. For instance, the PRB allocation of the code-words from scheduler 301 is different from the PRB allocation of the code-words from scheduler 302.

With reference to FIGS. 1 and 3, as exemplified in FIG. 3, with the subject asynchronous multi-point transmission schemes, (e.g., scheme 300), separate code-word(s) can be transmitted from each TP (e.g., TP1 and TP2). Unlike traditional multi-point transmission, with the subject asynchronous multi-point transmission schemes, the TPs are not required to transmit the same information. Rather each TP can transmit multiple layers and multiple code-word(s) to the UE. As a result, the respective TPs can employ independent schedulers (e.g., schedulers 301 and 302). Since separate schedulers are used it is not necessary for the PRB allocation (resource allocation) of the layers and code-word(s) from all the TPs to be same. This is at the core of the asynchronous multi-point transmission where the resource blocks allocated from each TP are independent. In addition, the TPs can schedule data transmission using independent schedulers with "non-ideal" backhaul between them. In this context "non-ideal" backhaul refers to having non-zero latency and finite bandwidth between the schedulers, thereby facilitating substantially long term coordination between the schedulers.

Further, since the UE receives the spatial layers from the TPs independently there, is no need to maintain a maintain strict time-frequency synchronization (e.g., QCL appearance) between the multiple TP. In particular, multiple and separate layers of the physical downlink shared channel (PDSCH) are transmitted from different TP (e.g., the different network TP devices 104) which can be treated as regular single user (SU)-MIMO at the UE. In some embodiments, the UE can optionally use advanced receiver processing techniques to address the possible inter-layer interference. In association with relaxing the QCL requirements associated with CoMP schemes, with the subject asynchronous multi-point transmission schemes, the amount and type of the CSI information provided by the UE to the respective TPs can vary. For example, in some implementations, only a subset of QCL related assumption information can be provided to the TPs (or their schedulers) by the UE 102 (e.g., beam-forming weights, delay spread, Doppler spread, Doppler shift, average gain, and average delay) in order to achieve the relaxed QCL requirements of the subject asynchronous multi-point transmission schemes. The type and amount of QCL assumption information needed to achieve the subject asynchronous multi-point transmission scheme should be evaluated carefully and can depend on the UE receive capability.

In accordance with various implementations, since the different TPs (e.g., the network TP devices 104) transmit multiple layers to the UE 102 independently, the subject asynchronous multi-point transmission schemes can account for the case where the total transmitted rank exceeds that maximum rank handling capability of the UE. For example if the UE has a maximum rank handling capability of 4 layers and each TP schedules 3 layers for the code-word(s) it is transmitting then the total rank at the UE is 6, more than what the UE can receive. In this scenarios the UE will not be able to decode the data and the transmission will be wasted. Therefore even though respective TPs can employ separate schedulers, some degree of coordination with respect to rank and layer partitioning between the respective TPs can provided by the subject asynchronous multi-point transmission schemes.

In some embodiments, in order to achieve rank and layer partitioning, the TPs (e.g., network TP devices 104) or their schedulers (not shown) can be configured to perform some "slow" TP coordination (e.g., wherein slow means with relatively low transport latency) to ensure that the total rank of the transmissions across all the TPs does not exceed the maximum rank the UE can handle and the layer mapping is different from each TP to avoid using the same layer on two or more TPs. In other embodiments, the UE can take on the responsibility of partitioning/assigning the spatial layers, PRB and transmission rank between TPs. For example, the UE 102 can be configured to determine (e.g., based on CSI, UE capability information, etc.) how to partition the spatial layers, PRB and transmission rank. The UE can further provide the respective TPs with feedback regarding the partitioned spatial layers, PRB and transmission rank. The TPs can then employ the feedback when formatting and sending code-word transmissions to the UE. These rank and layer partitioning coordination features are described in greater detail infra with reference to FIGS. 4-7.

The subject, asynchronous multi-point transmission techniques remove the need for the infrastructure based coordination required for LTE CoMP transmission. Unlike the LTE CoMP transmission, the asynchronous subject multi-point transmission schemes do not require ultra low latency transport between TPs for fast coordination. Nor do the subject multi-point transmission schemes require centralized scheduling, such as that provided by a C-RAN like architecture (which is mandatory for LTE CoMP transmission but can be hard to achieve). Multi-point transmission has become an essential technique to improve the fairness and reliability of wireless communication networks. Multi-point transmission will be particularly important in future wireless networks such as 5G networks and beyond, since operating at high frequency makes cell edge guarantee a very difficult proposition. The ability for the proposed asynchronous multi-point transmission schemes to work with independent schedulers and minimal coordination make them extremely valuable for 5G MIMO technology.

Figure 4:
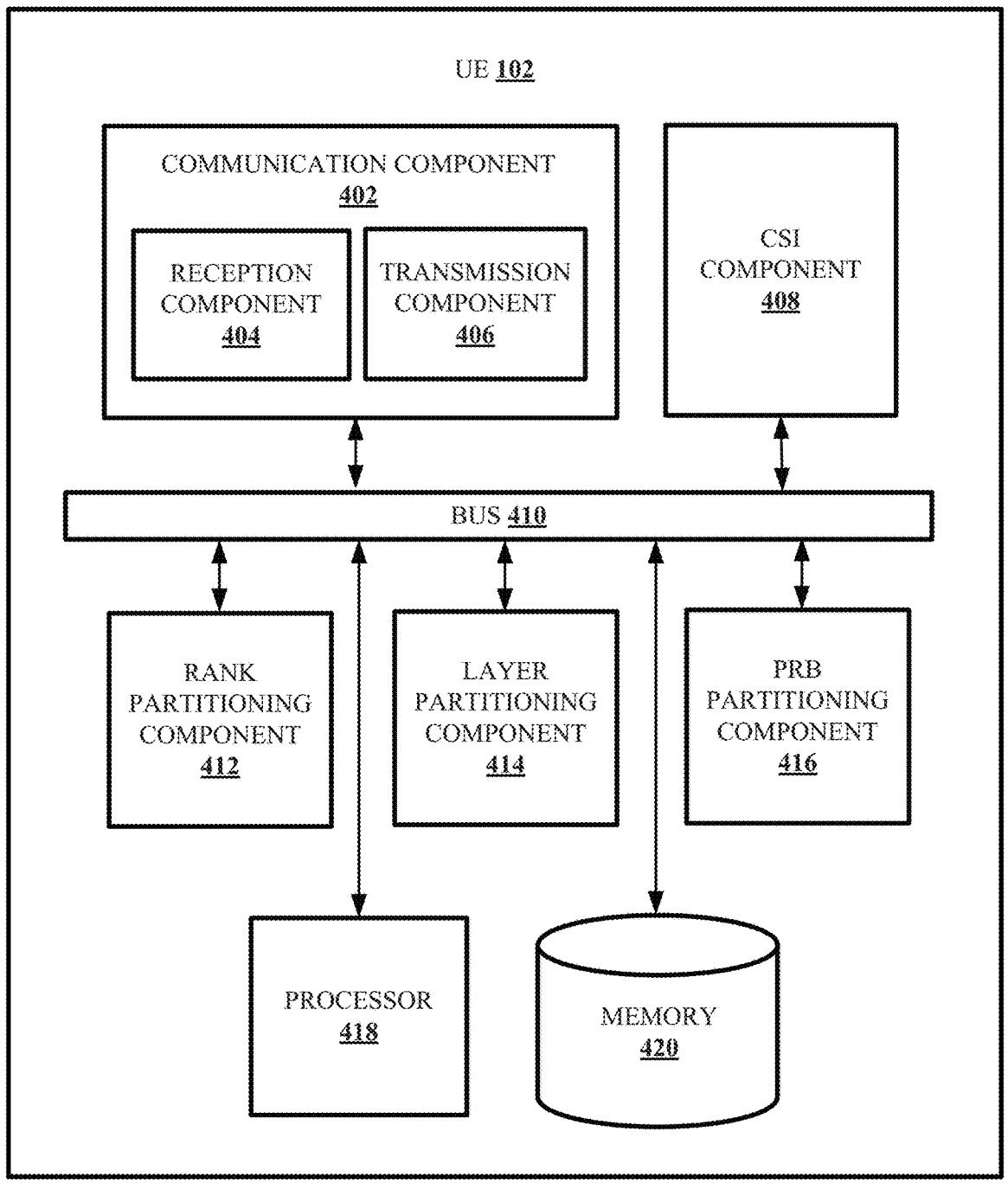
FIG. 4 presents high level a block diagram of an example UE configured to operate using asynchronous multi-point transmission schemes in accordance with various aspects and embodiments of the subject disclosure.

FIG. 4 presents a high level block diagram of an example UE (e.g., UE 102) configured to operate using asynchronous multi-point transmission schemes in accordance with various aspects and embodiments of the subject disclosure. Repetitive description of like elements employed in respective embodiments is omitted for sake of brevity.

In various embodiments, the UE 102 can include communication component 402, CSI component 408, rank partitioning component 412, layer partitioning component 412, and PRB partitioning component 416. The UE 102 can include memory 420 configured to store computer executable components and instructions. For example, although depicted outside of the memory 420, these computer executable components and instructions can include the communication component and/or software instructions associated with the communication component 402, the CSI component 408, the rank partitioning component 412, the layer partitioning component 414, and the PRB partitioning component 416. The UE 102 can also include a processor 418 to facilitate operation of the instructions (e.g., the computer executable components and instructions) by the UE 102. Examples of said processor 418 and memory 402, as well as other suitable computer or computing-based elements that can be employed by the UE 102, can be found with reference to FIG. 12. The UE can further include a device buss 410 that couples the various components of the UE 102 including, but not limited to, the communication component 402, the CSI component 408, the rank partitioning component 412, the layer partitioning component 414, the PRB partitioning component 416, the processor 418 and the memory 420.

The communication component 402 can facilitate wireless communication between the UE 102 and other devices, such as between the UE 102 and the network TP devices 104, the UE 102 and other UEs, the UE and one or more network devices 108, etc. The communication component 402 can be or include hardware (e.g., a central processing unit (CPU), one or more transmitters, one or more receivers, one or more transceivers, one or more decoders), software (e.g., a set of threads, a set of processes, software in execution) or a combination of hardware and software that facilitates one or more of the various types of wireless communications described herein. For example, the communication component 402 can include a reception component 404 that can include hardware and/or software to facilitate receiving and processing radio frequency (RF) signals transmitted to the UE 102 from another device. The communication component 402 can also include a transmission component 406 that can include hardware and/or software that facilitates transmitting RF data signals to other devices, including the respective network TP devices 104 of system 100. In some embodiments, the communication component 402 can includes a single antenna or port. In other embodiments, the communication component 402 can include a plurality of antenna's or ports. In various exemplary embodiments, the communication component 402 can support MIMO wireless communication protocols, including at least relatively simultaneous reception (e.g., in accordance with the relaxed QCL requirements of the subject asynchronous multi-point transmission techniques) of data signals transmitted by two or more geographically separated TPs. For example, in accordance with various aspects and embodiments of the subject disclosure, the receiver 404 can include hardware and software configured to receive and process (e.g., decode), RF data signals transmitted from two or more geographically separated TPs in accordance with the subject asynchronous multi-point transmission schemes.

Unlike traditional LTE CoMP multi-point transmission schemes, the data signals received and processed by the reception component 404 from two or more geographically separated TPs can be different with respect to content/information, formatting and/or reception time. For example, each of the data signals received from the respective TPs can include different code-word data. Unlike traditional multi-point transmission, with the subject asynchronous multi-point transmission schemes the TPs are not required to transmit the same information. Rather each TP can transmit different code-words and the reception component 404 can be configured to decode, process and combine the different code-word information included in the respective data signals to output a single data stream, data structure, data block, etc., that represents the original data sent to the UE and then assigned to the respective TPs (e.g., by the data assignment platform 110). As discussed above, the code-words can be different based on one of the following: e following: 1. they include or represent the same data, yet have different encoding schemes; 2. they include or represent different subsets or portions of the same data and have same encoding schemes; or 3. they include or represent different subsets of portions of the same data, yet have different encoding schemes.

In addition, to the data signals received from different TPs possibly including one or more different code-words, the code-words can be partitioned or mapped onto different spatial layers of the PDSCH. For example, with spatial multiplexing transmission techniques, one or more code-words may be distributed across 1, 2, 3 or 4 spatial layers. In various implementations, the number of layers used in any particular transmission depends (at least in part) on the rank indication (RI) feedback received from the UE, which identifies how many layers the UE can discern and/or is capable of handling. With the subject asynchronous multi-point transmission techniques, each of the TPs can include schedulers that independently determine the spatial layers used for data transmission. Thus, the reception component 404 can receive data signals from different geographically separated TPs, wherein at least one of the data signals includes one or more code-words mapped to different spatial layer(s) than another data signal. In various implementations, the receiver component 404 can further process the different spatially partitioned data signals using SU-MIMO processing techniques with optional advanced receiver processing to address potential inter-layer interference.

Further, the frequency allocation of the respective data signals received by the UE 102 receiver from two or more TPs can also by unsynchronized and thus vary. In particular, since separate schedulers are used by the respective TPs to schedule the respective data signals, it is not necessary for the PRB allocation (resource allocation) of the layers and code-word(s) from all the TPs to be same (e.g., as shown in FIG. 3). This is at the core of the asynchronous multi-point transmission where the resource blocks allocated from each TP are independent. Thus in various implementations, the resource blocks configurations of the respective data signals received by the UE 102 reception component 404 from two or more different TPs can vary.

Furthermore, another criteria relaxed as a result of the subject asynchronous multi-point transmission schemes is that the TPs do not need to maintain strict time-frequency synchronization between. Multiple and separate layers of PDSCH are transmitted from different TPs which can be treated as regular SU-MIMO at UE side. Thus in various embodiments, the timing of transmission and thus reception of the data signals from the respective TPs is not coordinated to maintain the QCL appearance requirement associated with CoMP. For example, in accordance with the subject asynchronous transmission techniques, the UE 102 reception component 404 can receive data signals from two or more TPs representative of a same data transport packet, yet the timing of transmission and thus reception of the data signals can be unsynchronized. For example, the window of time between reception of the different data transmissions can vary and be greater than a minimum window of time required for CoMP (e.g., greater than 3 ms).

Accordingly, in accordance with various implementations of the subject asynchronous multi-point transmission techniques, the UE 102 reception component 404 can receive two or more data signals from two or more network TPs respectively. Because tight coordinated scheduling between the TPs (or their schedulers) is not performed with the subject asynchronous multi-point transmission techniques, one or more of the data signals will (most likely in the absence of a chance coincidence) vary by at least one of: code-word(s) represented, spatial layer mapping, PRB allocation, or timing of receipt. The receiver component 404 can be however be configured to account for this variance and to decode and interpret the data signals to output a single data stream or data packet representative of the original (same) data packet/transport block provided to the respective TPs.

In one or more embodiments, the data signals transmitted by two or more TPs in accordance with the subject asynchronous multi-point transmission techniques, can be independently process by the respective TPs (or their schedulers) based in part on CSI feedback information provided by the UE to the respective TPs. For example, the particular code-word(s), layer mapping configuration, PRB assignment, MCS level, etc., of each of the data signals transmitted by the respective TPs can be determined based in part on CSI received from the UE 102. This CSI information can include one or more parameters related to but not limited to: transmission rank information (RI), the channel quality index information, MCS information, PMI information, beamforming weights, delay spread, Doppler spread, Doppler shift, average gain, and average delay, and the like. According to these embodiments, the UE can include CSI component 408 to determine CSI information for provision to the respective TPs. For example, the UE 102 can include CSI component 408 to perform CSI estimation.

In wireless communications, channel state information (CSI) refers to known channel properties of a communication link. This information describes how a signal propagates from the transmitter to the receiver and represents the combined effect of, for example, scattering, fading, and power decay with distance. The method is called channel estimation. The CSI makes it possible to adapt transmissions to current channel conditions, which is crucial for achieving reliable communication with high data rates in MIMO systems. CSI needs to be estimated at the receiving device (i.e., the UE 102 with respect to multi-point transmission) and quantized and fed back to the transmitting device (e.g., the network TP device), although reverse-link estimation is possible in TDD systems. Therefore, the transmitter and receiver can have different CSI. The CSI at the transmitter and the CSI at the receiver are sometimes referred to as CSIT and CSIR, respectively.

In one or more embodiments, in association with facilitating asynchronous multi-point transmission, the CSI component 508 can be configured to determine different CSI information for the respective TPs. The different CSI information can respectively represents the channel conditions associated with the respective links between the UE 102 and each of the TPs. For example, the UE can be configured with CSI resources (CSI-RS) from each of the TPs participating in an asynchronous multi-point transmission scheme. However, instead of measuring all the CSI-RS as a single CSI resource, the CSI component 508 can be configured to determine or measure the CSI-RS from each TP independently. This can be achieved by configuring the CSI component 508 to measure only partial CSI-RS or by configuring the CSI component 508 to measure the CSI-RS from each TP as a separate resource. The CSI component 508 can further be configured to provide each of the TPs with the CSI-RS information determined independently each TP. Each TP can thus make their own decisions regarding code-word(s), signal layer and frequency formatting, PRB allocation, etc., based in part of the individual CSI-RS information provided thereto.

In various embodiments of the subject asynchronous multi-point transmission schemes, two or more TPs transmit multiple layers to each UE independently. Accordingly, in some scenarios, without any coordination between the TPs, the total transmitted rank may exceed that maximum rank handling capability of the UE. In some embodiments, in order to prevent this scenario, the TPs or their schedulers can perform some soft coordination to ensure the rank is partitioned between the TPs such that the total transmission rank does not exceed the maximum rank handling capability of the UE. This soft coordination can involve, rank and spatial layer partitioning as well as PRB partitioning. These soft coordination techniques are discussed in greater detail infra with reference to FIG. 7 and the soft coordination component 718. In other embodiments, the UE can be configured to perform some UE side processing to partition rank, spatial layer mapping and PRB assignments between the respective TPs. The UE can further be configured to instruct the respective TP to process and format data packets or data transfer blocks accordingly in association with jointly transmitting data signals representative of the data packets/blocks to the UE. According to these embodiments, the UE can include rank partitioning component 412, layer partitioning component 414 and PRB partitioning component 416.

Figure 5:
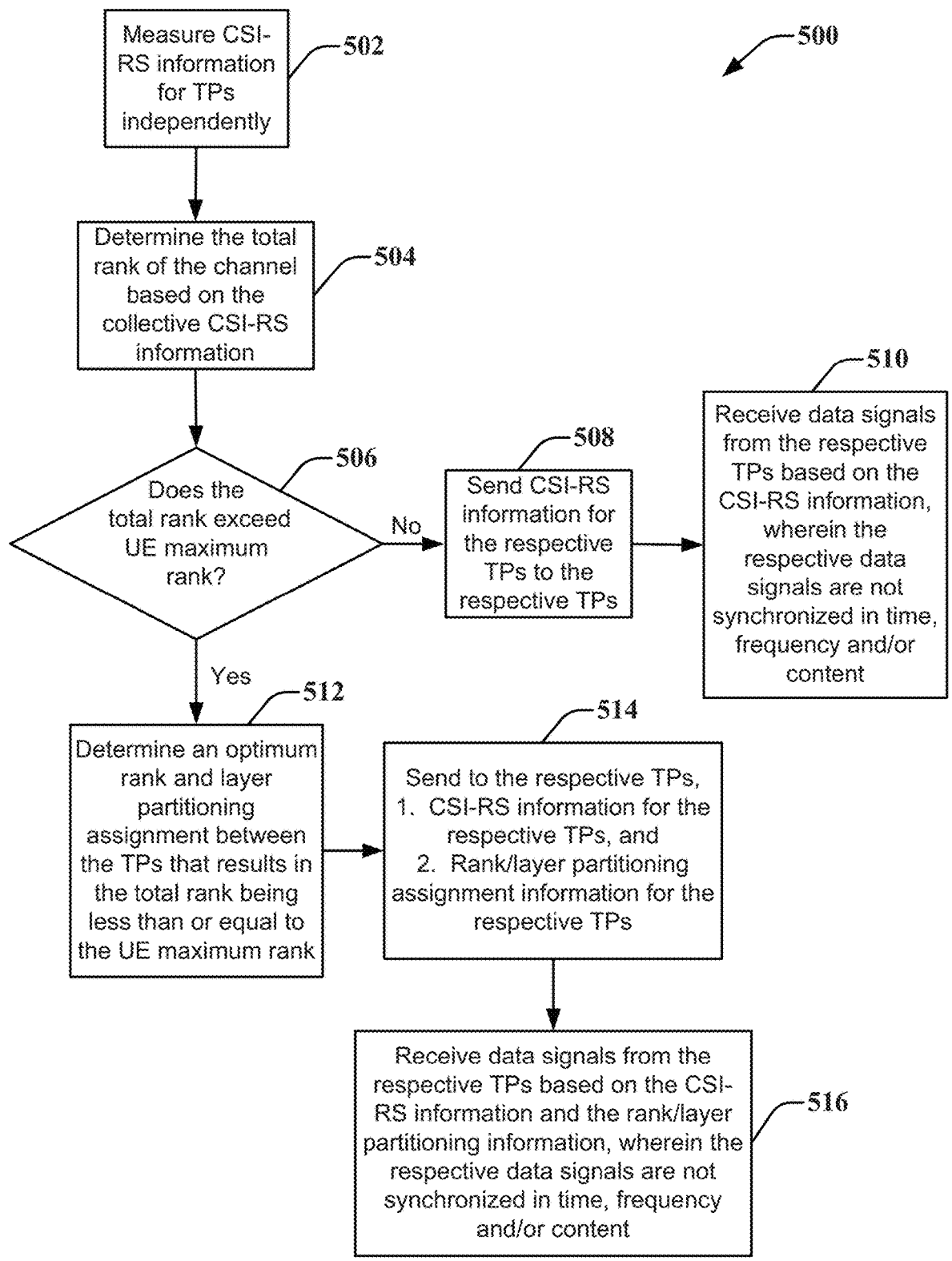
FIG. 5 presents a flow diagram of an example process facilitating asynchronous multi-point transmission by two or more TPs transmission based on UE determined rank and layer partitioning between the two or more TPs, in accordance with various aspects and embodiments of the subject disclosure.

FIG. 5 presents a flow diagram of an example process 500 facilitating asynchronous multi-point transmission by two or more TPs transmission based on UE determined rank and layer partitioning between the two or more TPs, in accordance with various aspects and embodiments of the subject disclosure. In one or more embodiments, process 500 can be performed by UE 102 using CSI component 408, rank partitioning component 512 and layer partitioning component 516. Repetitive description of like elements employed in respective embodiments is omitted for sake of brevity.

With reference to FIGS. 4 and 5, in one implementation, in association with partitioning rank and spatial layers, at 502, the CSI component 408 can measure CSI-RS information for TPs independently, wherein the TPs are associated with performing multi-point transmission with the UE. For example, for each TP involved in the multi-point transmission scheme, the CSI component 408 can determine CSI-RI information associated with the communication link established between the UE and the TP. At 504, using the rank partitioning component 412, the UE can determine the total rank of the shared PDSCH channel based on the collective CSI-RS information. For example, based on the CSI-RS information for each UE TP link, the UE can determine individual transmission ranks associated with each link. The UE can then determine the total rank of the channel based on the sum of the ranks associated with each link. At 506, using the rank partitioning component 412, the UE determines whether the total rank of the channel exceeds the UE maximum rank.

If at 506, the UE determines the total rank does not exceed the UE maximum rank capability, then method 500 continues to 508, wherein the UE sends the CSI-RS information for the respective TPs to the respective TPs. Then at 510, the UE receives data signals from the respective TPs based (in part) on the CSI-RS information. For example, the respective TPs can determine how to process a jointly received data transport block for transmitting to the UE based on the respective CSI-RS information provided to each TP from the UE. In some embodiments, the respective TPs can independently determine how to configure the code-word(s), how to map the code-word(s) to one or more spatial layers, how to assign the code-word(s) to respective PRB, etc. The TPs can further send the UE with data signals comprising information representative of the code-word(s) in their determined transmission format without synchronizing the time of transmission. Accordingly, in various embodiments, the respective data signals received by the UE from the different TPs will not be synchronized in time, frequency and/or (codeword) content. In some implementations, the TPs can perform some soft coordination prior to sending the data signals to the UE (which are received at 510) in order to ensure the total rank of the transmissions does not exceed the maximum rank capability of the UE (as discussed with reference to FIG. 7 and the soft coordination component 718).

If at 506, the UE determines the total rank does exceed the UE maximum rank capability, then method 500 continues to 512. At 512, using the rank partitioning component 412 and the layer partitioning component 514 respectively, the UE then determines an optimum rank and layer partitioning assignment between the TPs that results in the total rank being less than or equal to the UE maximum rank. For example, the UE can partition the spatial layers between the TPs so that the layer mapping is different from each TP to avoid using the same layer on two or more TPs. The UE can further determine an optimum combination of transmission rank from each TP. Then at 514, the UE can send the respective TPs, the CSI-RS information determined for the respective TPs, and rank/layer partitioning assignment information for the respective TPs. For example, the rank/layer partitioning assignment information can indicate to each TP, what transmission rank they are authorized to employ and what spatial layers the respective TPs can use. At 516, the UE receive data signals from the respective TPs based on the CSI-RS information (as described above) and the rank/layer partitioning information, wherein the respective data signals are not synchronized in time, frequency and/or (code-word) content. For example, upon the receipt of the rank/layer partitioning assignment information, each TP can be configured to transmit only the spatial layers to which it is assigned and its transmission rank cannot exceed the partitioned rank as indicated by the UE for that TP. However, in some implementations, each TP can choose the PRB allocation completely independently since there is no possibility of the total transmission rank from all the TP even exceeding the maximum rank handling capability of each UE.

In various embodiments, in addition to partitioning the rank and spatial layers employed by respective TPs to transmit data signals to the UE, the UE can also be configured to partition PRB. For example, another possible way to avoid the overall transmission rank from exceeding the UE's maximum rank capability is by partitioning the PRBs between the multiple TPs. So in essence, each TP can be allowed to transmit only over a subset of the system bandwidth and by ensuring that each TP transmits on disjoint and non-overlapping portions of the system bandwidth we can avoid the case where the transmission rank exceeds the maximum rank handling capability of the UE. As described infra with respect to FIG. 7 and the soft coordination component 718, in some embodiments, this disjoint PRB allocation can be achieved by coordination between the multiple schedulers of the respective TPs (much like the rank/layer partitioning). However, in various alternative embodiments, the UE can also be configured to determine the optimum choice of PRBs from each TP using PRB partitioning component 416. The UE can then send feedback to the respective TPs directing them to apply PRB assignment configuration determined by the PRB partitioning component 416.

Figure 6:
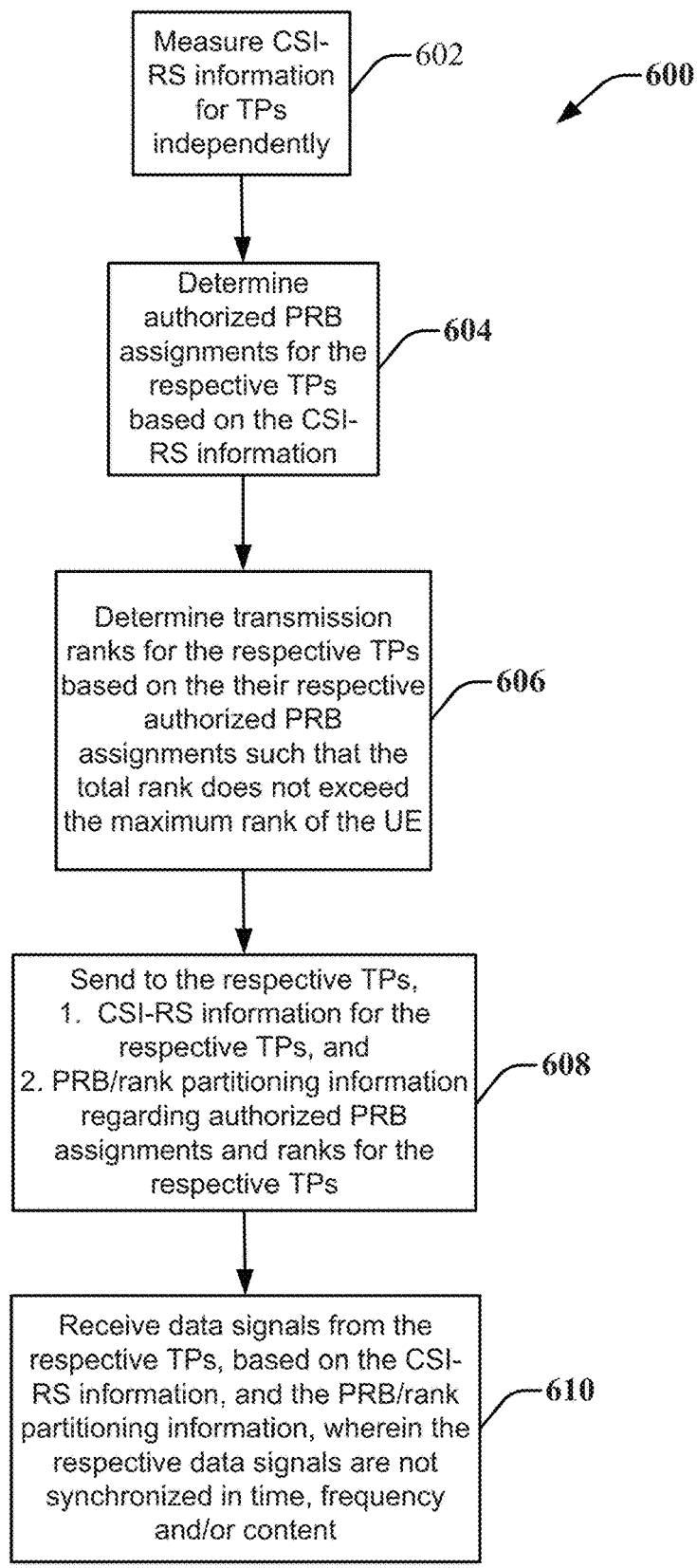
FIG. 6 presents a flow diagram of an example process facilitating asynchronous multi-point transmission by two or more TPs transmission based on UE determined PRB partitioning between the two or more TPs, in accordance with various aspects and embodiments of the subject disclosure.

For example, FIG. 6 presents a flow diagram of an example process 600 facilitating asynchronous multi-point transmission by two or more TPs transmission based on UE determined PRB partitioning between the two or more TPs, in accordance with various aspects and embodiments of the subject disclosure. In one or more embodiments, process 600 can be performed by UE 102 using CSI component 408, the rank partitioning component 412, and PRB partitioning component 416.

With reference to FIGS. 4 and 6, in one implementation, in association with partitioning rank and spatial layers, at 602, the CSI component 408 can measure CSI-RS information for TPs independently, wherein the TPs are associated with performing multi-point transmission with the UE. For example, for each TP involved in the multi-point transmission scheme, the CSI component 408 can determine CSI-RI information associated with the communication link established between the UE and the TP. At 604, using the PRB partitioning component 416, the UE can determine authorized PRB assignments for the respective TPs based on the CSI-RS information. For example, for each TP, the UE can determine a different set or group of one or more PRBs the TP can use to transmit code-word data. In one or more implementations, the UE can observe the channel over the entire system bandwidth and determines which TP is the best serving TP for a given PRB or group of PRB. Once the best TP is determined for each PRB or group of PRBs, the UE can then also compute a TP specific rank based on the PRB or group of PRBs the TP is allocated. At 606, using the PRB partitioning component 416 and/or the rank partitioning component 412, the UE determine transmission ranks for the respective TPs based on the their respective authorized PRB assignments such that the total rank of the channel does not exceed the maximum rank of the UE. Once important consideration is that the rank is TP specific and is computed only using the PRBs that the UE has chosen for the given TP.

At 608, the UE can send the respective TPs, the CSI-RS information determined for the respective TPs, and PRB/rank partitioning assignment information regarding authorized PRB assignments or ranks for the respective TPs. For example, once the optimum PRB partitioning between the TPs is determined the UE indicates its choice to the network and it also indicates which TP is allowed to transit on which PRB using what transmission rank. At 610, the UE receive data signals from the respective TPs based on the CSI-RS information (as described above) and the PRB rank/layer partitioning information, wherein the respective data signals are not synchronized in time, frequency and/or (code-word) content. For example, upon the receipt of this feedback, each TP can be configured to transmit only on the PRBs it is configured to and its transmission rank cannot exceed the rank as indicated by the UE for that TP. This way each TP can choose the PRB allocation completely independently as long as it chooses from the group of PRB it is allocated for the given UE. This also ensures that the maximum transmission rank for a given PRB is less than or equal to the maximum rank handling capability of the UE.

Figure 7:
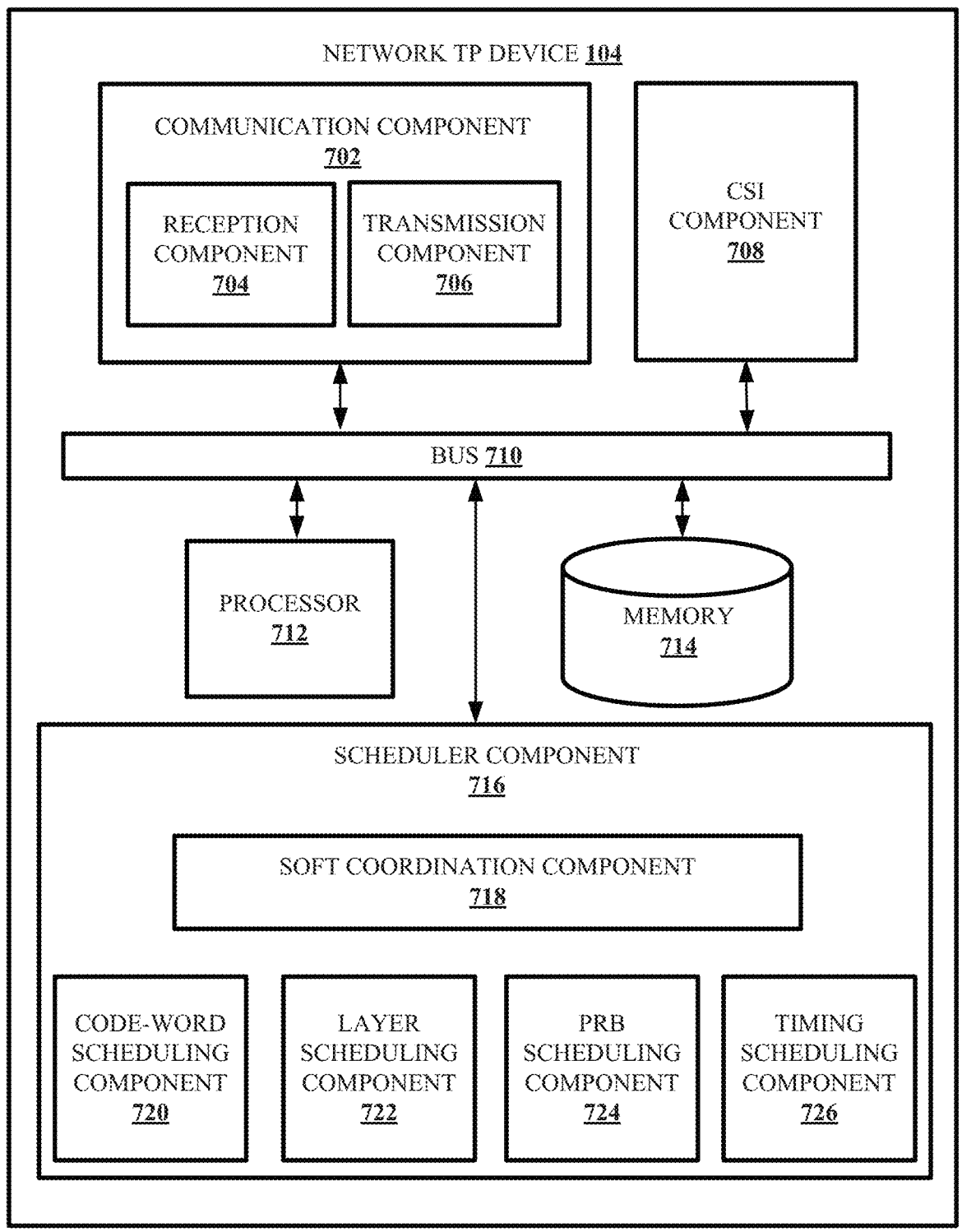
FIG. 7 presents a high level block diagram of an example network TP device configured to facilitate asynchronous multi-point transmission in accordance with various aspects and embodiments of the subject disclosure.

FIG. 7 presents a high level block diagram of an example network TP device (e.g., network TP device 104) configured to facilitate asynchronous multi-point transmission in accordance with various aspects and embodiments of the subject disclosure. Repetitive description of like elements employed in respective embodiments is omitted for sake of brevity.

In various embodiments, the network TP device 104 can include communication component 702, CSI component 708, and scheduler component 716. The network TP device 104 can include memory 714 configured to store computer executable components and instructions. For example, although depicted outside of the memory 714, the computer executable components stored by the memory 714 can include software instructions associated with the communication component 702, the CSI component 708, and the scheduler component 716. The network TP device 104 can also include a processor 712 to facilitate operation of the instructions (e.g., the computer executable components and instructions) by the network TP device 104. Examples of said processor 712 and memory 714 as well as other suitable computer or computing-based elements that can be employed by the network TP device 104, can be found with reference to FIG. 12. The network TP device 104 can further include a device buss 710 that couples the various components of the network TP device 104 including, but not limited to, the communication component 702, the CSI component 708, the scheduler component 716, the processor 712 and the memory 714.

The communication component 702 can facilitate wireless communication between the network TP device 104 and other devices, such UEs (e.g., UE 102). The communication component 702 can also facilitated wired and wireless communication between the network TP device 104 and one or more network devices (e.g., one or more network devices 108 of the core wireless communication network 106), etc. The communication component 702 can be or include hardware (e.g., a central processing unit (CPU), one or more transmitters, one or more receivers, one or more transceivers, one or more decoders), software (e.g., a set of threads, a set of processes, software in execution) or a combination of hardware and software that facilitates one or more of the various types of wireless and wireless communications described herein. For example, the communication component 702 can include a reception component 704 that can include hardware and/or software to facilitate receiving and processing radio frequency (RF) signals received from the UE 102. The communication component 702 can also include a transmission component 706 that can include hardware and/or software that facilitates transmitting RF data signals to other devices, such as the UE 102. In some embodiments, the communication component 702 can includes a single antenna or port. In other embodiments, the communication component 702 can include a plurality of antenna's or ports.

In various exemplary embodiments, the communication component 702 can support MIMO wireless communication protocols, including at least relatively simultaneous transmission (e.g., in accordance with the relaxed QCL requirements of the subject asynchronous multi-point transmission techniques) of data by the network TP device 104, and other network TP devices participating in asynchronous multi-point transmission, to a UE. For example, in accordance with various aspects and embodiments of the subject disclosure, the receiver 704 can include hardware and software configured to receive transport block data from the PDCP, RLS and MAC layers of a core wireless communication network. The transport block data is the data protocol unit (PDU) that the PHY layer (e.g., the network TP device 104) as data directed to a particular UE (e.g., UE 102). The network TP device 104 can be configured to process the data transport block in accordance with one or more aspects of the subject asynchronous multi-point transmission techniques (e.g., using the scheduler component 716) for sending to the UE via the transmitter component 706. The transmitter component 706 can thus include hardware and/or software to facilitate transmitting the processed data transport block as a data signal to the UE.

As previously described, unlike traditional LTE CoMP multi-point transmission schemes, the data signals sent to a UE by two or more geographically separated TPs can be different with respect to content/information, formatting and/or reception time. For example, a data signal transmitted by the network TP device 104 can include one or more code-words that represent a portion of data directed to the UE, wherein the one or more other TPs transmit data signals that included code-words representative of the other portions of the data. In another implementation, the network TP device 104 can transmit a code-word that includes or represents the same data as other code-words transmitted by the one or more other TPs, yet the respective code-words may differ in encoding schemes. In various embodiments, the respective TPs can transmit different code-words because the network TP device 104 and the other respective TP devices can process data-transport blocks independently and without synchronization or coordination with one another (e.g., using individual schedulers such as scheduler component 716).

For example, the network TP device 104 can include scheduler component 104 to facilitate processing and scheduling data transmissions for the network TP device 104 in accordance with one or more aspects of the subject asynchronous multi-point transmission schemes. The scheduler component can include code-word scheduling 720, layer scheduling component 722, PRB scheduling component 724, and timing scheduling component 726. The code-word scheduling component 720 can be configured to process received data transport blocks into code-words. The layer scheduling component 722 can be configured to map code-words to one or more spatial layers (e.g., of the PDSCH), the PRB scheduling component 724 can be configured to allocate the code-words and the spatial layers to PRB (e.g., of the PDSCH), and the timing scheduling component 726 can be configured to schedule the transmission time of data signals sent by the network TP device 104.

In accordance with one or more embodiments, the code-word scheduling component 720 performs little or no coordination with one or more other TP devices (or their schedulers) in association with generating code-word information from a received data transport block. Accordingly, the code-word information generated by the code-word scheduling component 720 can be different than the code-word information generated by the one or more other TP devices (or their schedulers).

In addition, to the data signals (generated from the same data transport block) transmitted different TPs possibly including data representing one or more different code-words, the code-words can be partitioned or mapped onto different spatial layers of the PDSCH. For example, in accordance with one or more embodiments, the layer scheduling component 722 can be configured to perform little or no coordination with one or more other TP devices (or their schedulers) in association with mapping code-word information to one or more spatial layers (e.g., of the PDSCH). Accordingly, the data signals generated by the scheduler component 716 can have different spatial layer mappings relative to data signals generated by the one or more other TP devices (or their schedulers).

Further, the frequency allocation of the respective data signals (generated from the same data transport block) transmitted to the UE by the network TP device 104 and one or more other TP can also be unsynchronized and thus vary. In particular, since separate schedulers are used by the respective TPs to schedule the respective data signals, it is not necessary for the PRB allocation (resource allocation) of the layers and code-word(s) from all the TPs to be same (e.g., as shown in FIG. 3). This is at the core of the asynchronous multi-point transmission where the resource blocks allocated from each TP are independent. Thus in various implementations, the PRB scheduling component 724 can be configured to perform little or no coordination with one or more other TP devices (or their schedulers) in association with allocating code-word information to one or more PRB (e.g., of the PDSCH).

Furthermore, another criteria relaxed as a result of the subject asynchronous multi-point transmission schemes is that the TPs do not need to maintain strict time-frequency synchronization between. Multiple and separate layers of PDSCH are transmitted from different TPs which can be treated as regular SU-MIMO at UE side. Thus in various embodiments, the timing of transmission and thus reception of the data signals from the respective TPs is not coordinated to maintain the QCL appearance requirement associated with CoMP. Thus in one or more embodiments, the timing scheduling component 726 can be configured to perform little or no coordination with one or more other TP devices (or their schedulers) in association with scheduling the transmission time of data signals sent by the network TP device 104.

In some embodiments, the scheduling component 716 or one or more components of the scheduling component 716 (e.g., soft coordination component 718, code-word scheduling component 720, layer scheduling component 722, PRB scheduling component 724, and timing scheduling component 726) can be provided on a separate network device that is communicatively coupled to the network TP device 104. For example, in some implementations, the scheduler component 716 can be, or be included at, a dedicated scheduler device (also referred to herein as a "scheduler"), that is communicatively coupled to the network TP device 104.

In one or more embodiments, the data signals transmitted by two or more TPs in accordance with the subject asynchronous multi-point transmission techniques, can be independently process by the respective TPs (or their schedulers) based in part on CSI feedback information provided by the UE to the respective TPs. For example, the particular code-word(s), layer mapping configuration, PRB assignment, transmission time, MCS level, etc., of the data signals processed and scheduled by the scheduler component 716 be determined based in part on CSI received from the UE 102.

This CSI information can include one or more parameters related to but not limited to: transmission rank information (RI), the channel quality index information, MCS information, PMI information, beamforming weights, delay spread, Doppler spread, Doppler shift, average gain, and average delay, and the like. According to these embodiments, the network TP device 105 can include CSI component 708 to receive CSI information from a UE and provide the information to the scheduler component 716 to facilitate processing data transport blocks. In various embodiments, the CSI information received by the CSI component 708 from a UE will be tailored to the network TP device 104 based on the wireless communication link established between the network TP device 104 and the UE. For example, a UE can be configured with CSI-RS resources from multiple TPs. But instead of measuring all the CSI-RS as a single CSI-RS resource the UE can be configured to measure the CSI-RS from each TP independently and report the CSI-RS to each TP independently. In various additional embodiments, the CSI component 708 can also measure transmitter side CSI information (e.g., CSIT), and the scheduler component 716 can also employ the CSIT in association with independently processing and scheduling data transport blocks.

In various embodiments of the subject asynchronous multi-point transmission schemes, two or more TPs transmit multiple layers to each UE independently. Accordingly, in some scenarios, without any coordination between the TPs, the total transmitted rank may exceed that maximum rank handling capability of the UE. In some embodiments, in order to prevent this scenario, the TPs or their schedulers can perform some soft coordination to ensure the rank is partitioned between the TPs such that the total transmission rank does not exceed the maximum rank handling capability of the UE. According to these embodiments, the scheduler component 716 can include soft coordination component 718 to facilitate this soft coordination. The soft coordination component 718 can be configured to facilitate partitioning the rank, spatial layers and/or PRB between the respective TPs. The soft coordination component 718 for example can be configured to partition rank, spatial layer and/or PRB in a same or similar manner as the rank partitioning component 412, the layer partitioning component 414 and the PRB partitioning component 416, respectively. The coordination performed by the soft coordination component 718 is considered "soft" because the time-scale of this soft coordination is not the same as the TTI (transit time interval). This is because rank changes in the channel are observed over much longer time-scales. Therefore latency of several TTIs or several tens of TTIs can be enough for this kind of slow coordination to partition the ranks, layers and/or PHBS between the TPs.

For example, with respect to rank and layer partitioning, the soft coordination component 718 can receive information from the other respective TPs (e.g., via their soft coordination components) regarding their individual ranks and determine whether a total rank of the channel exceeds a total rank of the UE (e.g., based on information RI received from the UE). Based on a determination that the total rank exceeds the UE maximum rank, the soft coordination component can partition the rank between the respective UEs such that the partitioned rank does not exceed the UE maximum rank. The soft coordination component 718 can also partition the layers between the respective TPs such that they use different and non-overlapping layers. The soft coordination component can then instruct each of the other TPs regarding their rank/layer assignments and their schedulers can configured the data signals accordingly. It should be appreciated that any one of the TPs can take on the coordination role and this can be agreed to by the respective TPs or assigned to a particular TP by the network. In other embodiments, a centralized scheduling device can perform this soft coordination that partitions the rank and layer assignments between the TPs. The PRB can be partitioned between the TPs using a same or similar process.

In other embodiments, as described with reference to FIGS. 4-6, the UE can take on the responsibility of portioning the rank, spatial layers and PHB between the respective TPs. According to these embodiments, in one implementation, the scheduler component 716 can receive information determined by the UE assigning the TP to a particular rank and spatial layer configuration. Upon the receipt of this feedback the scheduler component can configure data signals for transmission accordingly. For example, the scheduler component layer scheduling component 722 can configure a data signal for transmission by the network TP only using the spatial layers and rank it is assigned by the UE. However, the PRB scheduling component 724 can choose the PRB allocation at will (without synchronization with the other TPS PRB allocation) since there is no possibility of the total transmission rank from all the TPs exceeding the maximum rank handling capability of each UE. In another implementation, the scheduler component 716 can receive information determined by the UE assigning the TP to a particular rank and PRB configuration. The PRB configuration can identify a group of PRB that the network TP is authorized to use as well as the authorized rank. Upon receipt of this feedback, PRB scheduling component 724 can be configured to employ allocate the code-word information to one or more of the PRB included in the assigned group and the transmission rank cannot exceed the rank as indicated by the UE for that TP. This way each TP can choose the PRB allocation completely independently as long as it chooses from the group of PRBs it is allocated from the UE. This also ensures that the maximum transmission rank for a given PRB is less than or equal to the maximum rank handling capability of the UE.

Figure 8:
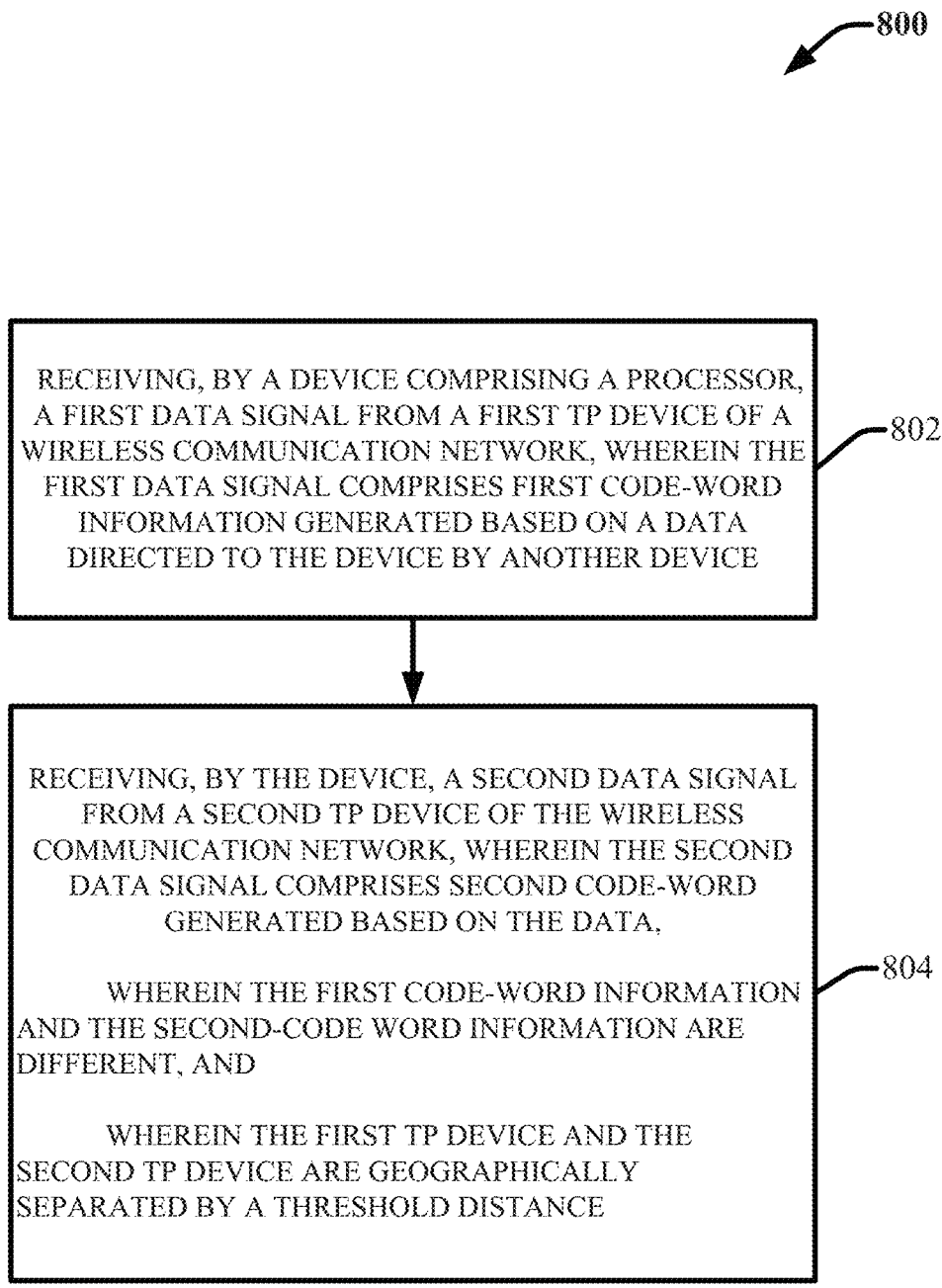
FIG. 8 illustrates an example method that facilitates asynchronous multi-point transmission in accordance with various aspects and embodiments of the subject disclosure.
Figure 9:
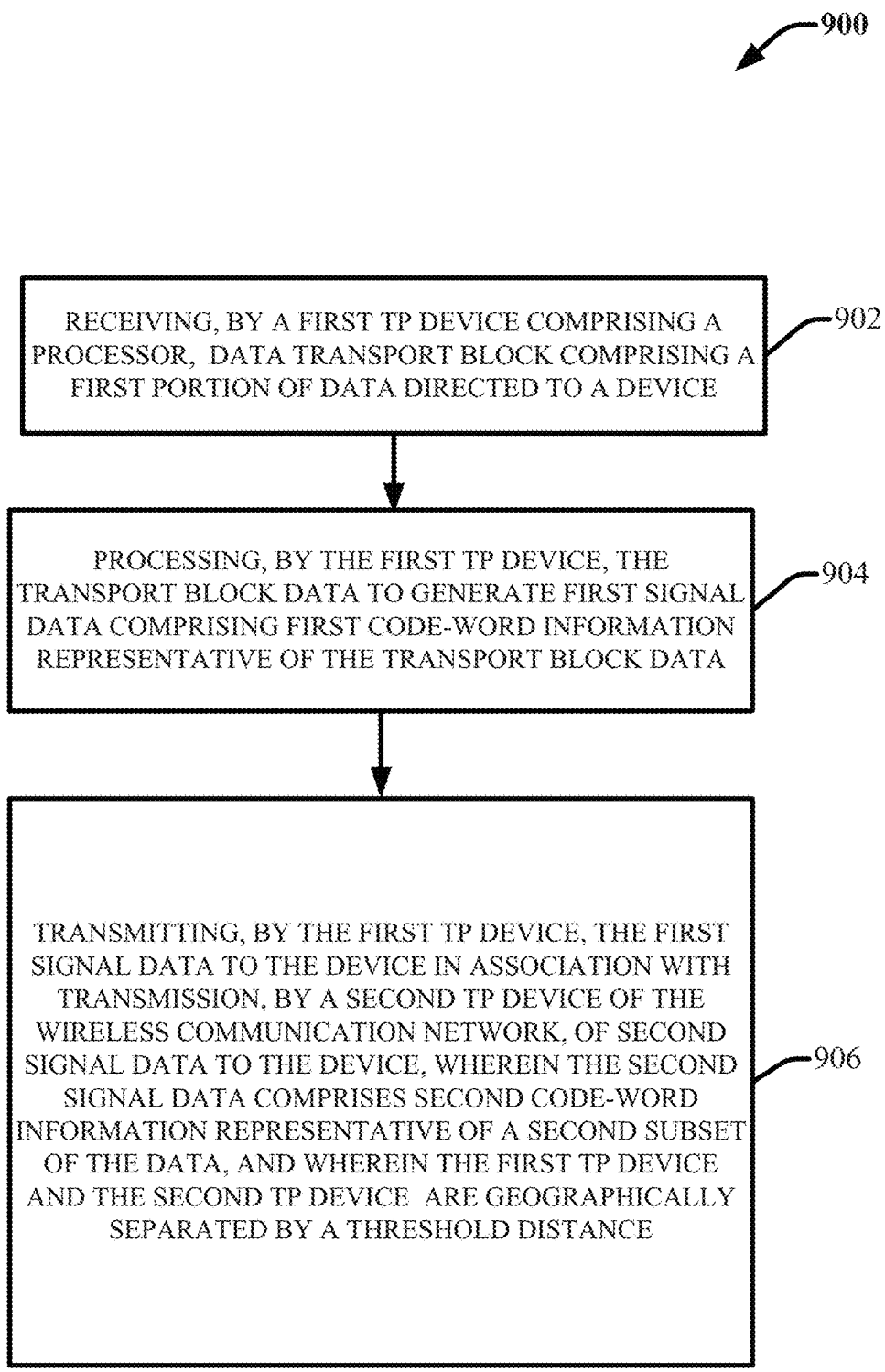
FIG. 9 illustrates another example method that facilitates asynchronous multi-point transmission in accordance with various aspects and embodiments of the subject disclosure.
Figure 10:
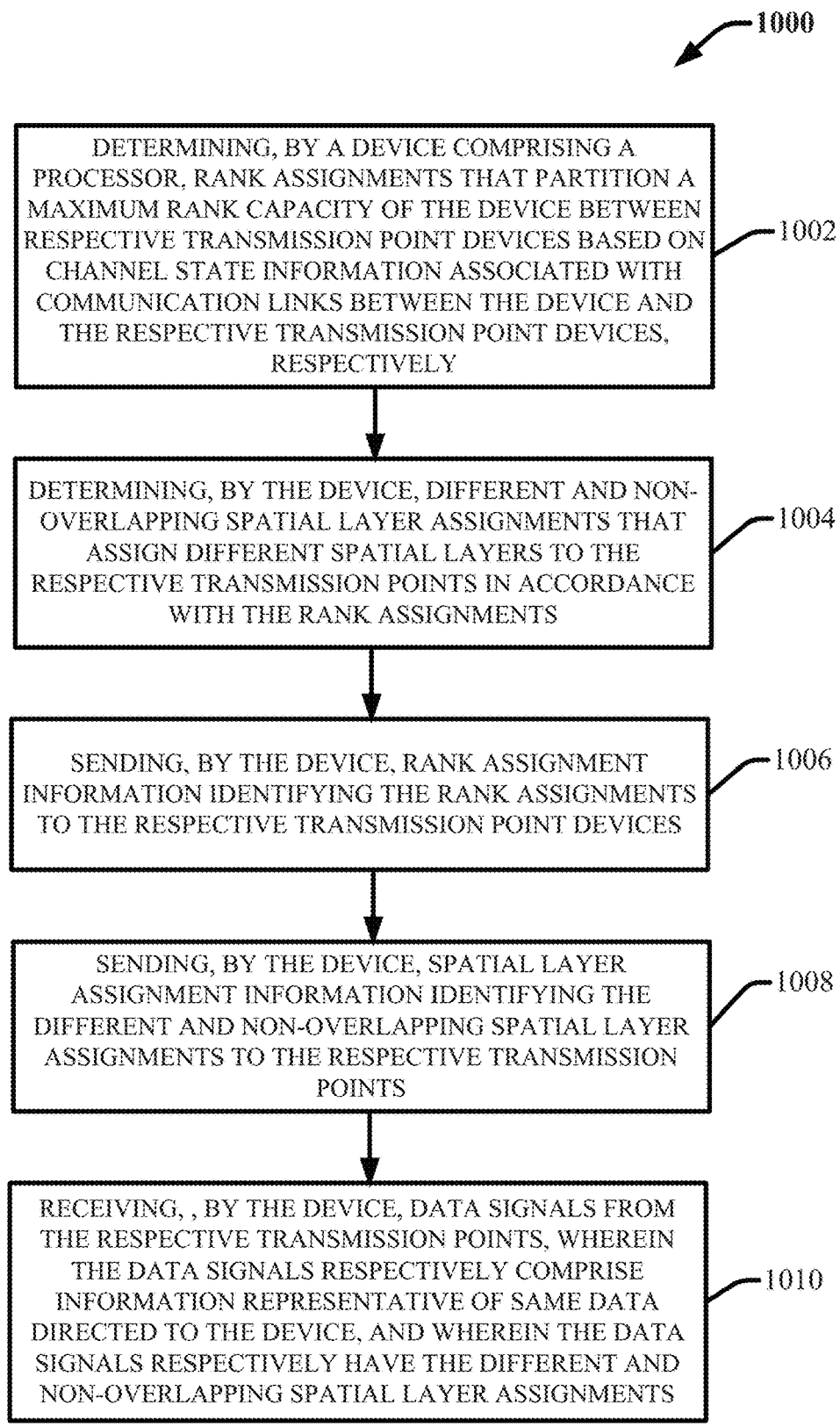
FIG. 10 illustrates an example method that facilitates asynchronous multi-point transmission in accordance with various aspects and embodiments of the subject disclosure.

In view of the example system(s) described above, example method(s) that can be implemented in accordance with the disclosed subject matter can be better appreciated with reference to flowcharts in FIGS. 8-10. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates an example method 800 that facilitates asynchronous multi-point transmission in accordance with various aspects and embodiments of the subject disclosure. In one or more embodiments, method 800 is performed by a UE (e.g., UE 102) in association with application of one or more features of the subject asynchronous multi-point transmission techniques. Repetitive description of like elements employed in respective embodiments is omitted for sake of brevity.

At 802, a device comprising a processor (e.g., a UE 102), receives first data signal from a first TP device of a wireless communication network (e.g., system 100), wherein the first data signal comprises first code-word information generated based on data directed to the device by another device. At 804, the device receives a second data signal from a second TP device of the wireless communication network, wherein the second data signal comprises second code-word generated based on the data transport block, wherein the first code-word information and the second-code word information are different, and wherein the first transmission point device and the second TP are geographically separated by a threshold distance. In various implementations, the first code-word information and the second code-word information are different based on usage of separate and unsynchronized transmission signal schedulers (e.g., schedulers 301 and 302) by the first TP device and the second TP device, respectively.

In some implementations, the timing of transmission of the first data signal and the second data signal by the first and second TPs can also be unsynchronized. For example, the first data signal and the second data signal may be received by the device at unsynchronized times based on usage of separate and unsynchronized transmission signal schedulers by the first TP device and the second TP device, respectively.

In addition, in some implementations, the first data signal and the second data signal can comprise different and non-overlapping PRB (PRB) allocations for the first code-word information and the second code-word information, respectively. For example, the first data signal and the second data signal can comprise the different and non-overlapping PRB allocations based on usage of separate and unsynchronized transmission signal schedulers by the first TP device and the second TP device, respectively. In some aspects, despite using separate and unsynchronized schedulers resulting in the different and non-overlapping PHB allocations, the total rank of the first data signal and the second data signal does not exceed a maximum rank capacity of the device. In particular, as described herein, one way to avoid the overall transmission rank from exceeding the UE's maximum rank capability is by partitioning the PRBs between the multiple TPs. For example, by directing each TP to transmit only over a subset of the system bandwidth and ensuring that each TP transmits on disjoint and non-overlapping portions of the system bandwidth, the case where the transmission rank exceeds the maximum rank handling capability of the UE is avoided. In one implementation, this disjoint PRB allocation is achieved based on a result of a PRB partitioning coordination procedure performed between the first TP device and the second TP device. In another implementation, this disjoint PRB allocation is achieved based on determination of the PRB partitioning by the device and provision of information identifying the PRB partitioning to the respective first and second TPs.

Further, in various additional implementations, the first data signal and the second data signal can comprise different and non-overlapping spatial layer assignments for the first code-word information and the second code-word information, respectively. For example, the first data signal and the second data signal can comprise the different and non-overlapping spatial layer assignments based on usage of separate and unsynchronized transmission signal schedulers by the first TP device and the second TP device, respectively. In some aspects, despite using separate and unsynchronized schedulers resulting in the different spatial layer assignments, the different spatial layers assignments do not overlap and a total rank of the first data signal and the second data signal does not exceed a maximum rank capacity of the device. In this case the spatial layers are partitioned between the multiple TPs with the constraint that the sum of the partitioned layers across all the TPs is equal to or less than the maximum rank that the UE can receive. In one implementation, this spatial layer partitioning is achieved based on a result of a spatial layer and rank partitioning coordination procedure performed between the first TP device and the second TP device. In another implementation, this spatial layer partitioning is achieved based on determining the different spatial layer assignments and rank assignments by the device in view of the maximum rank capacity of the device, and provision of information identifying the different spatial layer assignments and the rank assignments to the respective first and second TPs.

FIG. 9 illustrates an example method 900 that facilitates asynchronous multi-point transmission in accordance with various aspects and embodiments of the subject disclosure. In one or more embodiments, method 900 is performed by a TP device of a wireless communication system (e.g., one of the network TP devices 104) in association with application of one or more features of the subject asynchronous multi-point transmission techniques. Repetitive description of like elements employed in respective embodiments is omitted for sake of brevity.

At 902, a first TP device comprising a processor receives data transport block comprising a first portion of data directed to a device (e.g., UE 102). For example, the first TP device can receive a data transport block comprising a portion of user data sent to the device from another device, wherein a network device (e.g., the data assignment platform 110) partitions the use data between TPs to increase throughput. At 904, the first TP device processes the data to generate first signal data comprising first code-word information representative of the data. At 906, the first TP device transmits the first signal data to the device in association with transmission, by a second TP device of the wireless communication network, of second signal data to the device. In accordance with these operations, the second signal data comprises second code-word information representative of a second subset of the data. In addition, the first TP device and the second TP device are geographically separated by a threshold distance. In one or more implementations, the transmitting the first signal data is unsynchronized in time relative to the transmission of the second signal data based on usage of separate and unsynchronized transmission signal schedulers by the first TP device and the second TP device, respectively. In some implementations, the first code-word information and the second code-word information are different based on usage of separate and unsynchronized transmission signal schedulers by the first TP device and the second TP device, respectively.

In some implementations, the first data signal and the second data signal comprise different and non-overlapping physical resource block allocations for the first code-word information and the second code-word information, respectively, based on usage of separate and unsynchronized transmission signal schedulers by the first transmission point device and the second transmission point device, respectively. In various implementations, the first data signal and the second data signal comprise different and non-overlapping physical resource block allocations for the first code-word information and the second code-word information, respectively, based on usage of separate and unsynchronized transmission signal schedulers by the first transmission point device and the second transmission point device, respectively. According to these implementations, method 900 can further includes receiving, by the first TP device from the device, a first resource block assignment information determined by the device that identifies first physical resource blocks authorized for usage by the first transmission point device. The method 900 can further include allocating, by the first TP device, the first code-word information to one or more of the first physical resource blocks based on the receiving. According to these implementations, the second signal data is allocated to one or more second physical resource blocks based on reception of information, by the second transmission point device, that identifies second physical resource blocks authorized for usage by the second transmission point device.

In some additional implementations, the first data signal and the second data signal comprise different spatial layer assignments for the first code-word information and the second code-word information, respectively, based on usage of separate and unsynchronized transmission signal schedulers by the first transmission point device and the second transmission point device, respectively. With these additional implementations, method 900 can further include, receiving by the first TP device from the device, spatial layer assignment information determined by the device that identifies a spatial layer assignment for the first code-word information, and receiving, from the device, rank assignment information determined by the device that identifies a rank for the first signal data. The method 900 can further include configuring the first signal data based on the spatial layer assignment information and the rank assignment information, wherein the different spatial layers assignments do not overlap and a total rank of the first data signal and the second data signal does not exceed a maximum rank capacity of the device, based on the configuring.

FIG. 10 illustrates another example method 1000 that facilitates asynchronous multi-point transmission in accordance with various aspects and embodiments of the subject disclosure. In one or more embodiments, method 1000 is performed by a UE (e.g., UE 102) in association with application of one or more features of the subject asynchronous multi-point transmission techniques. Repetitive description of like elements employed in respective embodiments is omitted for sake of brevity.

At 1002, a device comprising a processor (e.g., a UE 102), determines rank assignments that partition a maximum rank capacity of the device between respective TP devices based on channel state information associated with communication links between the device and the respective TP devices, respectively. Although various aspects of the subject asynchronous multi-point transmission schemes are exemplified using two TPs, it should be appreciated that the number of TPs include two or more TPS (e.g., three TPs, four TPs, etc.). At 1004, the device determines different and non-overlapping spatial layer assignments that assign different spatial layers to the respective TPs in accordance with the rank assignments. At 1006, the device sends rank assignment information identifying the rank assignments to the respective TP devices. At 1008, the device sending spatial layer assignment information identifying the different and non-overlapping spatial layer assignments to the respective TPs. For example, the device can determine and send each individual TP a spatial layer and rank assignment that is particularly determined for each individual TP. Each TPs spatial layer and/or rank assignment will be different. At 1010, the device receives data signals from the respective TPs, wherein the data signals respectively comprise information representative of same data directed to the device, and wherein the data signals respectively have the different and non-overlapping spatial layer assignments.

Figure 11:
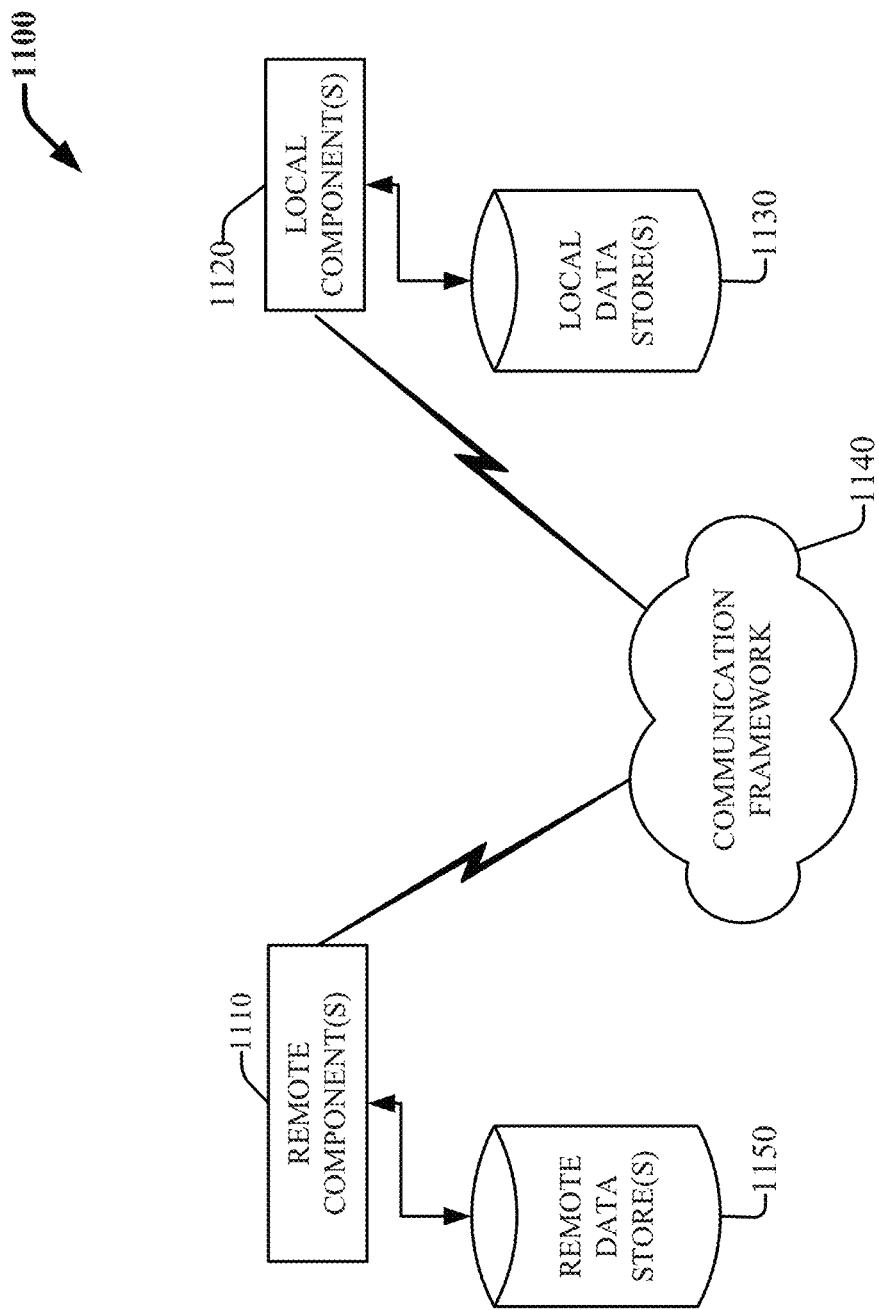
FIG. 11 depicts an example schematic block diagram of a computing environment with which the disclosed subject matter can interact.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can comprise servers, personal servers, wireless telecommunication network devices, RAN device(s), etc. As an example, remote component(s) 1110 can be network TP device 114, network devices 118, network device 600 and the like. The system 1100 also comprises one or more local component(s) 1120. The local component(s) 1120 can be hardware and/or software (e.g., threads, processes, computing devices). In some embodiments, local component(s) 1120 can comprise, for example, UE 112, UE 500, and the like.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via an LTE network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 12:
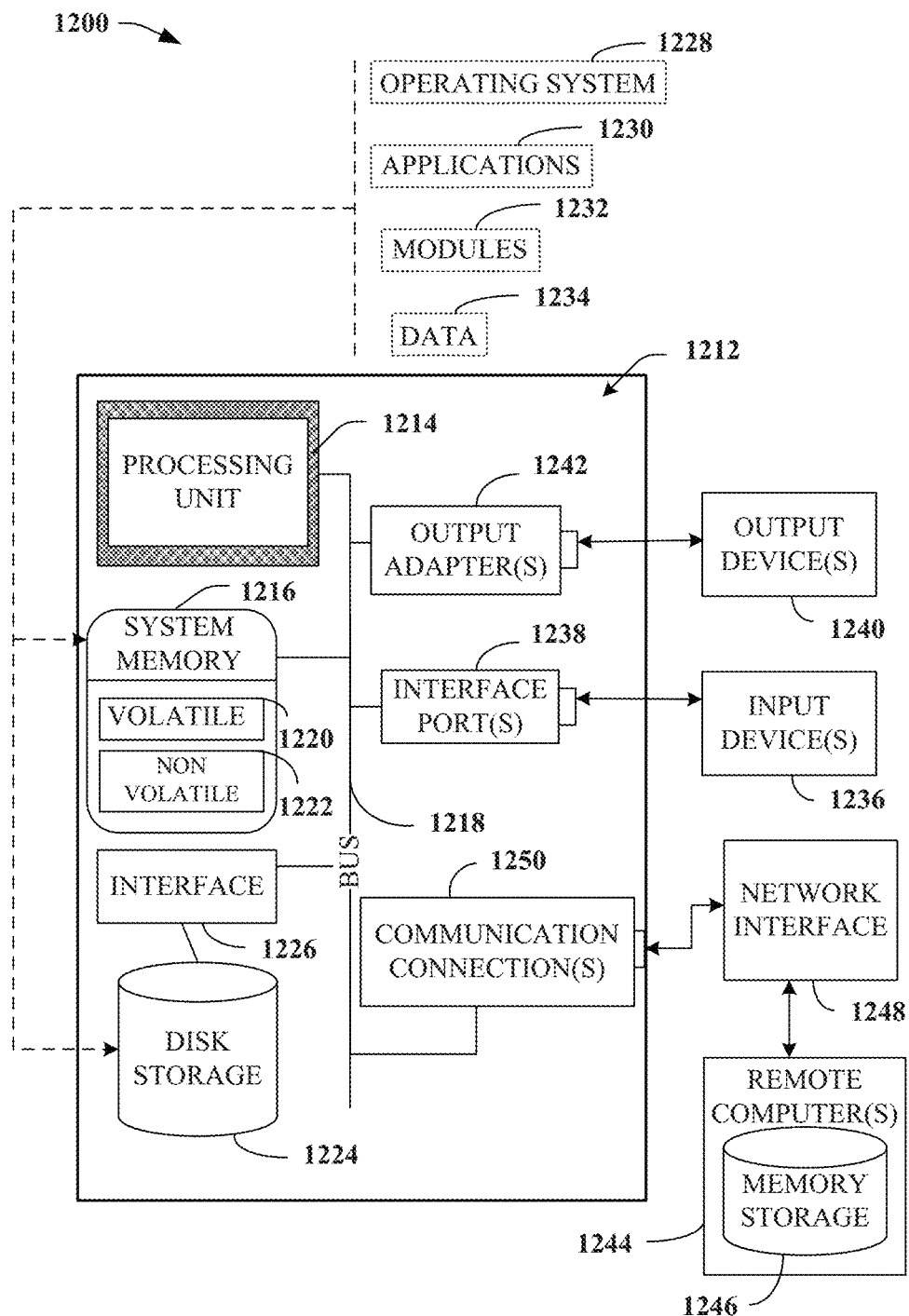
FIG. 12 illustrates an example block diagram of a computing system operable to execute the disclosed systems and methods in accordance with an embodiment.

FIG. 12 illustrates a block diagram of a computing system 1200 operable to execute the disclosed systems and methods in accordance with an embodiment. Computer 1212, which can be, for example, a UE (e.g., UE 102), a network node (e.g., network TP device 104), a core network device (e.g., network device 108, and the like) comprises a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 12104), and small computer systems interface.

System memory 1216 can comprise volatile memory 1220 and nonvolatile memory 1222. A basic input/output system, containing routines to transfer information between elements within computer 1212, such as during start-up, can be stored in nonvolatile memory 1222. By way of illustration, and not limitation, nonvolatile memory 1222 can comprise read only memory, programmable read only memory, electrically programmable read only memory, electrically erasable read only memory, or flash memory. Volatile memory 1220 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1212 can also comprise removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, flash memory card, or memory stick. In addition, disk storage 1224 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1224 to system bus 1218, a removable or non-removable interface is typically used, such as interface 1226.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alternative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1212. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 comprise, for example, a serial port, a parallel port, a game port, a universal serial bus, an infrared port, a Bluetooth port, an IP port, or a logical port associated with a wireless service, etc. Output device(s) 1240 use some of the same type of ports as input device(s) 1236.

Thus, for example, a universal serial bus port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 comprise, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1212. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a device comprising a processor, spatial layer assignment information that partitions spatial layers of a wireless communication channel among transmission point devices configured to transmit data to the device via the wireless communication channel using a multi-point transmission protocol, wherein the determining the spatial layer assignment information comprises determining the spatial layer assignment information based on a rank capacity of the device;
   sending, by the device, the spatial layer assignment information to the transmission point devices;
   receiving, by the device, a first data signal from a first transmission point device of the transmission point devices via a first grouping of the spatial layers determined based on the spatial layer assignment information; and receiving, by the device, a second data signal from a second transmission point device of the transmission point devices via a second grouping of the spatial layers determined based on the spatial layer assignment information.

2. The method of claim 1, wherein the first data signal and the second data signal comprise different codewords.

3. The method of claim 1, wherein the first data signal and the second data signal comprise different codewords based on usage of separate and uncoordinated schedulers by the transmission point devices.

4. The method of claim 1, wherein the first grouping of the spatial layers and the second grouping of the spatial layers were independently determined without coordination between the first transmission point device and the second transmission point device.

5. The method of claim 1, wherein the device comprises a first device and wherein the method further comprises:
combining, by the device, the first data signal and the second data signal to derive a message sent to the device by a second device.

6. The method of claim 1, wherein the first transmission point device and the second transmission point device are geographically separated by a threshold distance.

7. The method of claim 1, wherein the first data signal and the second data signal are allocated to different physical resource blocks.

8. The method of claim 7, wherein the different physical resource blocks were independently allocated by the first transmission point device and the second transmission point device.

9. The method of claim 1, wherein a total rank of the first data signal and the second data signal does not exceed the rank capacity of the device based on application of the spatial layer assignment information by the first transmission point device and the second transmission point device to determine the first grouping of the spatial layers and the second grouping of the spatial layers.

10. The method of claim 1, wherein the determining the spatial layer assignment information is responsive to a determination that a combined rank of the transmission point devices exceeds the rank capacity of the device.

11. A device, comprising:
a processor; and
a memory that stores executable instructions that, when executed by the processor, facilitate performance of operations, comprising:
determining spatial layer assignment information that partitions spatial layers of a wireless communication channel among transmission point devices configured to transmit data to the device via the wireless communication channel using a multi-point transmission protocol, wherein the determining the spatial layer assignment information comprises determining the spatial layer assignment information based on a rank capacity of the device;
enabling the transmission point devices to access the spatial layer assignment information;
receiving, from a first transmission point device of the transmission point devices, a first data signal via a first group of the spatial layers determined based on the spatial layer assignment information; and
receiving, from a second transmission point device of the transmission point devices, a second data signal via a second group of the spatial layers determined based on the spatial layer assignment information.

12. The device of claim 11, wherein the first data signal and the second data signal comprise different codewords.

13. The device of claim 11, wherein the first group of the spatial layers and the second group of the spatial layers were independently determined without coordination between the first transmission point device and the second transmission point device.

14. The device of claim 11, wherein the first data signal and the second data signal comprise different parts of a message directed to the device, and wherein the operations further comprise:
decoding the first data signal and the second data signal to derive the message.

15. The device of claim 11, wherein the first transmission point device and the second transmission point device are geographically separated by at least a defined distance.

16. The device of claim 11, wherein the first data signal and the second data signal are allocated to different physical resource blocks.

17. The device of claim 16, wherein the different physical resource blocks were independently allocated by the first transmission point device and the second transmission point device.

18. The device of claim 11, wherein the determining the spatial layer assignment information is responsive to a determination that a combined rank of the transmission point devices exceeds the rank capacity of the device.

19. A non-transitory machine-readable storage medium, comprising executable instructions that, when executed by a processor of a device, facilitate performance of operations, comprising:
determining spatial layer assignment information that partitions spatial layers of a wireless communication channel among transmission point devices configured to transmit data to the device via the wireless communication channel using a multi-point transmission protocol, wherein the determining the spatial layer assignment information comprises determining the spatial layer assignment information based on a rank capacity of the device;
providing the spatial layer assignment information to the transmission point devices;
obtaining, from a first transmission point device of the transmission point devices, a first data signal via a first subset of the spatial layers determined based on the spatial layer assignment information; and
obtaining, from a second transmission point device of the transmission point device, a second data signal via a second subset of the spatial layers determined based on the spatial layer assignment information.

20. The non-transitory machine-readable storage medium of claim 19, wherein the first data signal and the second data signal comprise different codewords and different physical resource block configurations determined without coordination between the first transmission point device and the second transmission point device.

* * * * *